US012789904B2

(12) United States Patent
Rasa et al.

(10) Patent No.: US 12,789,904 B2
(45) Date of Patent: Nov. 10, 2026

(54) VEHICLE

(71) Applicant: Polaris Industries Inc., Medina, MN (US)

(72) Inventors: Joshua A. Rasa, Forest Lake, MN (US); John B. Pircon, Stacy, MN (US); Andy Ives, Harris, MN (US); Robert C. Wilmot, Stacy, MN (US); Dennis Lutz, Blaine, MN (US)

(73) Assignee: POLARIS INDUSTRIES INC., Medina, MN (US)

( * ) Notice: Subject to any disclaimer, the term of this patent is extended or adjusted under 35 U.S.C. 154(b) by 343 days.

(21) Appl. No.: 18/405,756

(22) Filed: Jan. 5, 2024

(65) Prior Publication Data

US 2024/0227941 A1 Jul. 11, 2024

Related U.S. Application Data

(60) Provisional application No. 63/437,467, filed on Jan. 6, 2023.

(51) Int. Cl.
*B62D 23/00* (2006.01)
*B62D 25/04* (2006.01)
*B62D 27/02* (2006.01)

(52) U.S. Cl.
CPC ........... *B62D 23/005* (2013.01); *B62D 25/04* (2013.01); *B62D 27/023* (2013.01)

(58) Field of Classification Search
CPC ............................ B62D 23/005; B62D 21/183
See application file for complete search history.

(56) References Cited

U.S. PATENT DOCUMENTS

| | | | |
|---|---|---|---|
| D300,011 | S | 2/1989 | Oba et al. |
| D301,849 | S | 6/1989 | Oba et al. |
| D312,989 | S | 12/1990 | Murata et al. |
| D327,237 | S | 6/1992 | Miyamoto et al. |
| D467,200 | S | 12/2002 | Luo et al. |
| D500,707 | S | 1/2005 | Lu |
| D503,658 | S | 4/2005 | Lu |
| D535,215 | S | 1/2007 | Turner et al. |
| D549,133 | S | 8/2007 | LePage |
| D622,631 | S | 8/2010 | Lai et al. |
| D633,006 | S | 2/2011 | Sanschagrin et al. |
| D640,171 | S | 6/2011 | Danisi |
| 8,613,335 | B2 | 12/2013 | Deckard et al. |
| D701,469 | S | 3/2014 | Lai et al. |
| D703,102 | S | 4/2014 | Eck et al. |
| D737,724 | S | 9/2015 | Schroeder et al. |
| 9,327,587 | B2 | 5/2016 | Spindler et al. |
| D762,522 | S | 8/2016 | Kinoshita |
| D772,755 | S | 11/2016 | Tandrup et al. |
| D804,993 | S | 12/2017 | Eck et al. |

(Continued)

*Primary Examiner* — Nicholas McFall
(74) *Attorney, Agent, or Firm* — SCHWEGMAN LUNDBERG & WOESSNER, P.A.

(57) ABSTRACT

A utility vehicle, or UTV, provides a strong, yet lightweight chassis, a set of modular body panels, and various field-serviceability features which enable the UTV to be used in demanding environments such as off-road racing and challenging terrain. An integrated engine and transmission cooler and bodywork vents reduce weight while providing for component cooling while the vehicle is in operation. Passenger/navigator features facilitate use of the vehicle in team-oriented driving, including off-road racing.

21 Claims, 35 Drawing Sheets

(56) References Cited

U.S. PATENT DOCUMENTS

| | | | | |
|---|---|---|---|---|
| D816,551 | S | 5/2018 | Leyrikh | |
| 11,293,467 | B2 * | 4/2022 | Tiramani ............... | B62D 21/09 |
| 12,117,048 | B2 * | 10/2024 | Olason ................... | B60K 17/24 |
| 2018/0148103 | A1 * | 5/2018 | Castillo ................ | B62D 23/005 |
| 2018/0215415 | A1 * | 8/2018 | Isom ...................... | B60N 2/015 |

* cited by examiner

VEHICLE

CROSS-REFERENCE TO RELATED APPLICATIONS

The present disclosure claims priority to U.S. Provisional Application No. 63/437,467, filed Jan. 6, 2023 and titled VEHICLE, the complete disclosure of which is incorporated herein by reference.

BACKGROUND

Technical Field

The present disclosure relates to off-road vehicles (e.g., utility vehicles or "UTVs") and, more particularly, to a features for an off-road vehicle designed for high-speed and/or high-performance operation.

Description of the Related Art

Utility vehicles, or UTVs, are used for on- or off-road applications. A UTV includes a chassis housing and supporting an engine and a transmission, which in turn are operably coupled to the front and/or rear wheels to provide motive power to drive the vehicle.

Generally, the chassis of a UTV is a steel structure designed to absorb the shocks of off-road use, protect the occupants, and provide mounting points and surfaces for vehicle systems and body panels. However, particularly where UTVs are used for high speed driving and/or very difficult terrain, it is also desirable to make the overall vehicle as light as possible. A balance must therefore be struck between chassis strength and vehicle weight.

Body panels may or may not fully enclose the occupants of the UTV, and therefore, the occupants may be exposed to the elements (cold, rain, mud, etc.). Body panels offering more coverage also offer more protection from such exposure. However, body panels also obscure the area around the vehicle, potentially impairing a driver's (or passenger's) lines of sight in difficult terrain. A balance must therefore be struck between occupant protection and driver/passenger visibility.

SUMMARY

The present disclosure provides a utility vehicle, or UTV, which provides a strong, yet lightweight chassis, a set of modular body panels, and various field-serviceability features which enable the UTV to be used in demanding environments such as off-road racing and challenging terrain. An integrated engine and transmission cooler and bodywork vents reduce weight while providing for component cooling while the vehicle is in operation. Passenger/navigator features facilitate use of the vehicle in team-oriented driving, including off-road racing.

In one form thereof, the present disclosure provides a chassis for a side-by-side utility vehicle, the chassis including a front section and a rear section. The front chassis section includes a primary tubular assembly defining an upper quadrilateral and a front quadrilateral, and a reinforcing tubular assembly fixed to the primary tubular assembly, the reinforcing tubular assembly having cross braces defining an upper triangle and a lower triangle with a junction therebetween. The chassis also includes a left chassis section positioned longitudinally between the front chassis section and the rear chassis section, and a right chassis section positioned longitudinally between the front chassis section and the rear chassis section and laterally spaced from the left chassis section.

In another form thereof, the present disclosure provides a chassis for a side-by-side utility vehicle, the chassis including a front chassis section and a rear chassis section. The front chassis section includes a plurality of front tubes welded to one another and a front weldment formed from a first plurality of sheet metal components welded to one another, the front tubes welded to the front weldment. The rear chassis section includes a plurality of rear tubes welded to one another and a rear weldment formed from a second plurality of sheet metal components welded to one another, the rear tubes welded to the rear weldment. The chassis also includes a left chassis section positioned longitudinally between the front chassis section and the rear chassis section, and a right chassis section positioned longitudinally between the front chassis section and the rear chassis section and laterally spaced from the left chassis section.

In another form thereof, the present disclosure provides a chassis for a side-by-side utility vehicle, the chassis including a front chassis section having a plurality of front tubes welded to one another and a rear chassis section comprising a plurality of rear tubes welded to one another. The chassis also includes a left chassis section positioned longitudinally between the front chassis section and the rear chassis section, the left chassis section including a left A-pillar and a left B-pillar, and a right chassis section positioned longitudinally between the front chassis section and the rear chassis section and laterally spaced from the left chassis section, the right chassis section including a right A-pillar and a right B-pillar. The plurality of rear tubes include a left upper frame tube and a right upper frame tube, a left lower frame tube and a right lower frame tube, a cross brace extending laterally from the left upper frame tube to the right upper frame tube, a left pillar brace extending from a forward end of the left upper frame tube to a junction with the left B-pillar, and a right pillar brace extending from a forward end of the right upper frame tube to a junction with the right B-pillar. The rear chassis section further includes a left lower joiner including cradles respectively sized and configured to receive and interfit with the left upper frame tube, a left end of the cross brace, and the left pillar brace, and a right lower joiner including cradles respectively sized and configured to receive and interfit with the right upper frame tube, a right end of the cross brace, and the right pillar brace.

In yet another form thereof, the present disclosure provides a chassis for a side-by-side utility vehicle, the chassis including a front chassis section comprising a plurality of front tubes welded to one another and a front weldment, and a rear chassis section comprising a plurality of rear tubes welded to one another. The chassis further includes a left chassis section positioned longitudinally between the front chassis section and the rear chassis section, the left chassis section including a left A-pillar at a front portion thereof and a left B-pillar at a rear portion thereof, and a right chassis section positioned longitudinally between the front chassis section and the rear chassis section and laterally spaced from the left chassis section, the right chassis section including a right A-pillar at a front portion thereof and a right B-pillar at a rear portion thereof. The chassis further includes a left outer base tube extending from the left A-pillar to the left B-pillar, a left outer joiner tube extending from a junction between the left outer base tube and the left A-pillar to a junction with the front chassis section, a left inner base tube extending from a lower end of the left B-pillar to a junction with the front chassis section, a right outer base tube extending from the right A-pillar to the right B-pillar, a right outer joiner tube extending from a junction between the right outer base tube and the right A-pillar to a junction with the front chassis section, and a right inner base tube extending from a lower end of the right B-pillar to a junction with the front chassis section. The left and right inner base tubes are positioned inwardly and downwardly relative to the left and right outer base tubes, respectively, and the left and right inner base tubes converge from a wide rear spacing at their respective junctions with left and right B-pillars to a narrow forward spacing at their respective junctions with the front weldment. The chassis creates a profile that tapers inwardly towards a bottom of chassis as viewed from the front or rear that increases clearance along the lower, outer sides thereof.

In yet another form thereof, the present disclosure provides a chassis for a side-by-side utility vehicle, the chassis including a front chassis section comprising a plurality of front tubes welded to one another, a rear chassis section comprising a plurality of rear tubes welded to one another, a left chassis section positioned longitudinally between the front chassis section and the rear chassis section, the left chassis section including a left A-pillar at a front portion thereof and a left B-pillar at a rear portion thereof, and a right chassis section positioned longitudinally between the front chassis section and the rear chassis section and laterally spaced from the left chassis section, the right chassis section including a right A-pillar at a front portion thereof and a right B-pillar at a rear portion thereof. The chassis further includes a left outer base tube extending from the left A-pillar to the left B-pillar, the left outer base tube having a left jack point tube extending transversely therethrough, and a right outer base tube extending from the right A-pillar to the right B-pillar, the right outer base tube having a right jack point tube extending transversely therethrough.

In still another form thereof, the present disclosure provides a side-by-side utility vehicle including a set of ground engaging members and a chassis supported by the ground engaging members. The chassis includes a left section defining a left opening for driver ingress and egress, a right section defining a right opening for passenger ingress and egress, a front section forward of the left and right sections, and a rear section rearward of the left and right sections. The vehicle further includes a driver door is attached to the left section of the chassis, a top portion of the driver door defining a V-shaped void overlapping the left opening, such that full access to the left opening is provided for ingress and egress, and a removable driver door panel selectively attachable to at least one of the driver door and the left section of the chassis, the removable driver door panel sized and shaped to fill in the V-shaped void.

In another form thereof the present disclosure provides a side-by-side utility vehicle including a set of ground engaging members and a chassis supported by the ground engaging members. The chassis includes a left section defining a left opening for driver ingress and egress, a right section defining a right opening for passenger ingress and egress, a front section forward of the left and right sections, and a rear section rearward of the left and right sections. The vehicle further includes a driver door attached to the left section of the chassis, the driver door including a foothold cutout along the bottom edge thereof, the foothold cutout positioned above and adjacent to a left-side tube of the chassis, the foothold cutout sized to receive a foot of the driver.

In yet another form thereof, the present disclosure provides a side-by-side utility vehicle including a set of ground engaging members and a chassis supported by the ground engaging members. The chassis includes a left section defining a left opening for driver ingress and egress, a right section defining a right opening for passenger ingress and egress, a front section forward of the left and right sections, and a rear section rearward of the left and right sections. The vehicle further includes a driver door attached to the left section of the chassis, and a rear left quarter panel selectively covering a portion of the left side of the rear section of the chassis, the rear left quarter panel pivotably connected to the driver door and pivotable between a closed position, in which the left side of the rear section of the chassis is covered by the rear left quarter panel, and an open position, in which the left side of the rear section of the chassis is exposed.

In still another form thereof, the present disclosure provides a side-by-side utility vehicle including a set of ground engaging members and a chassis supported by the ground engaging members. The chassis includes a left section defining a left opening for driver ingress and egress, a right section defining a right opening for passenger ingress and egress, a front section forward of the left and right sections, and a rear section rearward of the left and right sections. The vehicle further includes a rear suspension including a left rear shock and a right rear shock, a front suspension including a left front shock and a right front shock, and a rear left quarter panel covering a portion of the left side of the rear section of the chassis, the rear left quarter panel including a left rear vent positioned forwardly of the left rear shock, such that the left rear vent allows an air flow therethrough to cool the left rear shock as the vehicle moves forward.

In still another form thereof, the present disclosure provides a side-by-side utility vehicle including a set of ground engaging members, a chassis supported by the ground engaging members, an engine supported by the chassis, a transmission supported by the chassis, the transmission functionally interposed between the engine and the ground engaging members, and a cooling system. The cooling system includes a radiator defining a plurality of fins contained within and supported by a radiator frame, an engine cooling circuit having an engine coolant inlet, and an engine coolant outlet, with a first fluid cooling path through a first portion of the plurality of fins, and a transmission cooling circuit having a transmission coolant inlet, and an transmission coolant outlet, with a second fluid cooling path through a second portion of the plurality of fins. The engine cooling circuit is fluidly isolated from the transmission cooling circuit, such that engine coolant and transmission coolant do not intermix within the radiator.

In still another form thereof, the present disclosure provides a side-by-side utility vehicle including a set of ground engaging members and a chassis supported by the ground engaging members. The chassis includes a left section defining a left opening for driver ingress and egress, a right section defining a right opening for passenger ingress and egress, a front section forward of the left and right sections, and a rear section rearward of the left and right sections, wherein a cab is defined within the chassis between the left section and the right section, and between the front section and the rear section. The vehicle further includes a driver seat positioned on a first side of the cab, a passenger seat positioned on a second side of the cab laterally opposite the first side, and a passenger station positioned forward of the passenger seat. The passenger station includes at least one of a grab bar and a mounting bracket configured to attach to a tablet or other computer, and an adjustable arm fixed to at least one of the grab bar and the mounting bracket, the adjustable arm extendable between an extended position defining a first distance from the passenger seat and a retracted position defining a second distance from the passenger seat, the first distance less than the second distance.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, where.

Corresponding reference characters indicate corresponding parts throughout the several views. Unless stated otherwise (e.g., by stating that a drawing is "schematic"), the drawings are proportional and drawn to scale.

DETAILED DESCRIPTION

Figure 1:
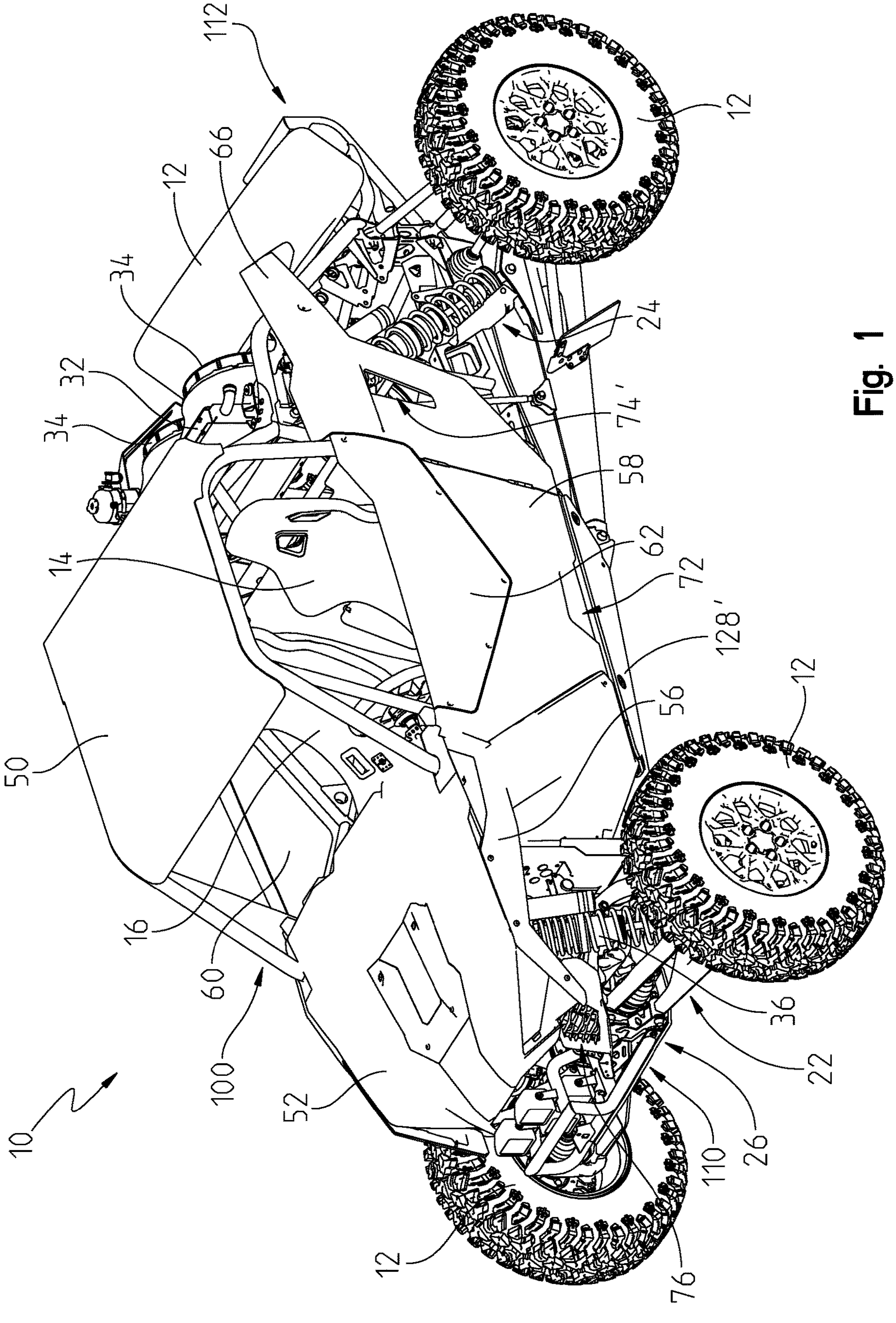
FIG. 1 is a front, left-side perspective view of a vehicle made in accordance with the present disclosure.

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a side-by-side type utility vehicle, it is contemplated that the design features discussed herein may also be applied to other types of vehicles, such as straddle-type vehicles including all-terrain vehicles, motorcycles and snowmobiles, or other vehicles as required or desired for a particular application.

For purposes of the present disclosure, "weldments," "welded" assemblies and the like refer to both the method of production and the product itself. That is, a weldment or welded assembly is made by abutting two or more pieces of metal and welding the pieces together using any suitable welding technique, such as arc welding. TIG welding, MIG welding, gas welding, stick welding, or laser welding, for example. The resulting structure is a "welded structure" which is readily identifiable as such by a person of ordinary skill in the art of metalworking. For example, a welded structure has readily identifiable, visible weld beads along the abutting surfaces. Heating and cooling also generates microstructural changes which may be visible to the naked eye, and in any case are readily discoverable, as properties of the metal structure itself.

In some instances throughout this disclosure, positional relationships (e.g., top, bottom, right, left, front, back) may be used in reference to the described vehicle. Such use is intended to refer to positions and orientations, and relationships therebetween, from the perspective of a typical user and a typical use of the vehicle. That is, a left view coincides with a perspective viewing the driver's side of the vehicle, i.e., the left side of the vehicle from the perspective of a driver (or passenger) seated within the cab of the vehicle. A right view is opposite of the left view. A front view coincides with a perspective viewing the vehicle frame head on from a position directly forward of the vehicle frame and a back, and a rear view is opposite of the front view. A top view coincides with a perspective viewing the vehicle frame from a top-down perspective from a position vertically above the vehicle frame and a bottom view is opposite of the top view. For convenience, these orientation and directions are referenced herein.

FIGS. 1-7 illustrate vehicle 10 made in accordance with the present disclosure. Vehicle 10 is a utility vehicle or "UTV" including a set of four ground engaging members 12, which are shown as wheels but can also be tracks or other ground engaging members in other configurations. A spare ground engaging member 12 may be mounted to the rear of the vehicle 10. Chassis 100, described in detail below, is supported by the four ground engaging members 12. A front bumper 110 is mounted to the front of chassis 100 and provides protection from brush and impacts, as well as a mounting point for auxiliary headlights. A rear bumper 112 is mounted to the rear of chassis 100 and provides additional protection, as well as a jacking point as described below.

Figure 3:
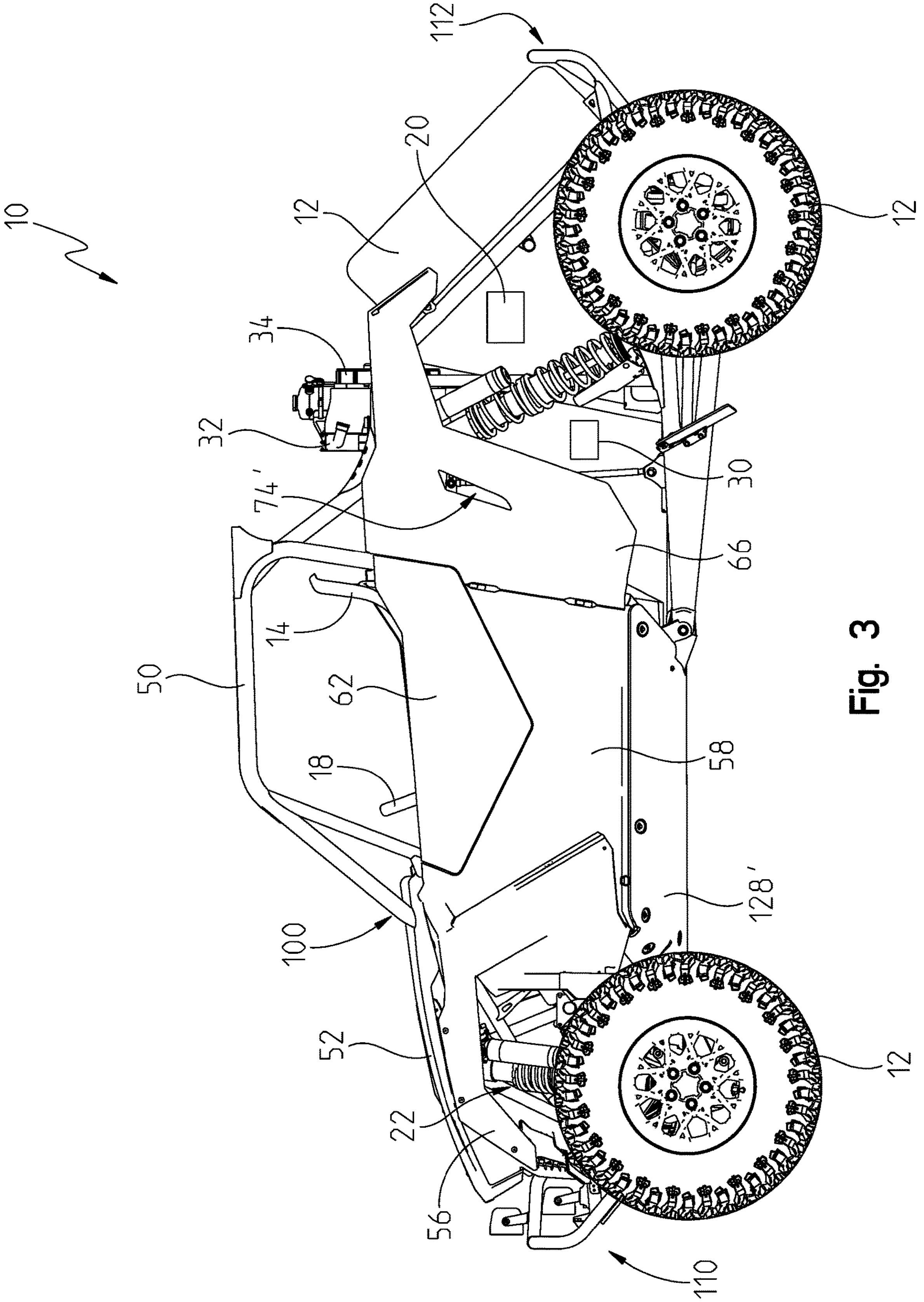
FIG. 3 is a left-side elevation view of the vehicle shown in FIG. 1.
Figure 11:
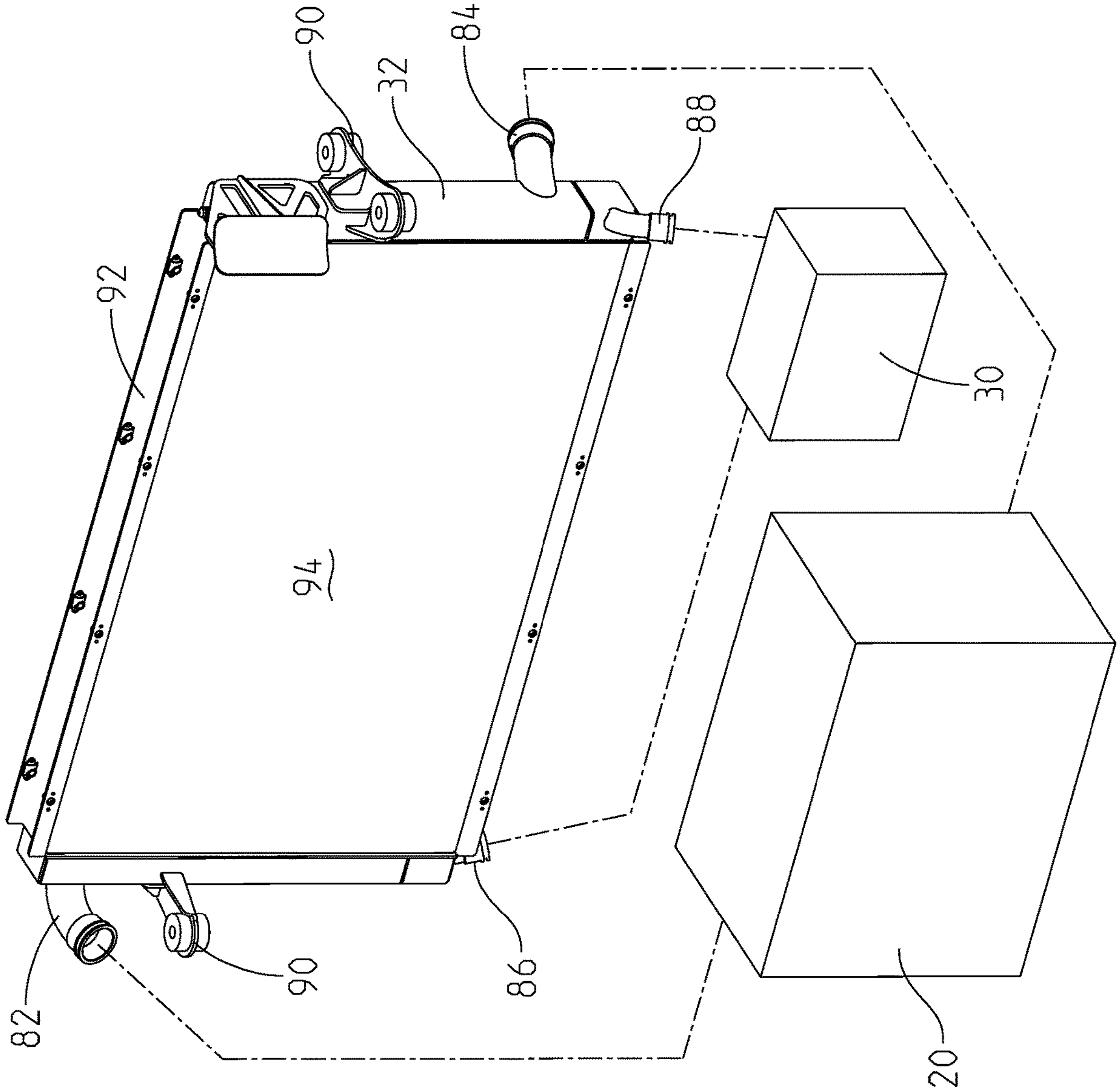
FIG. 11 is a rear, right-side perspective view of the radiator shown in FIG. 10, with a schematically illustrated engine and transmission connected thereto.

Vehicle 10 includes an engine 20 and a transmission 30, shown schematically in FIGS. 3 and 11. Both engine 20 and transmission 30 may be supported by a rear section 108 of chassis 100, which transmission 30 functionally interposed (i.e., in a power-transmitting relationship) between engine 20 and ground engaging members 12. Engine 20 produces power from gasoline or another liquid fuel, which is transmitted to at least two, and in some cases all four, of ground engaging members 12 via transmission 30. Engine 20 may alternatively be an electric motor which produces power from batteries.

Figure 8:
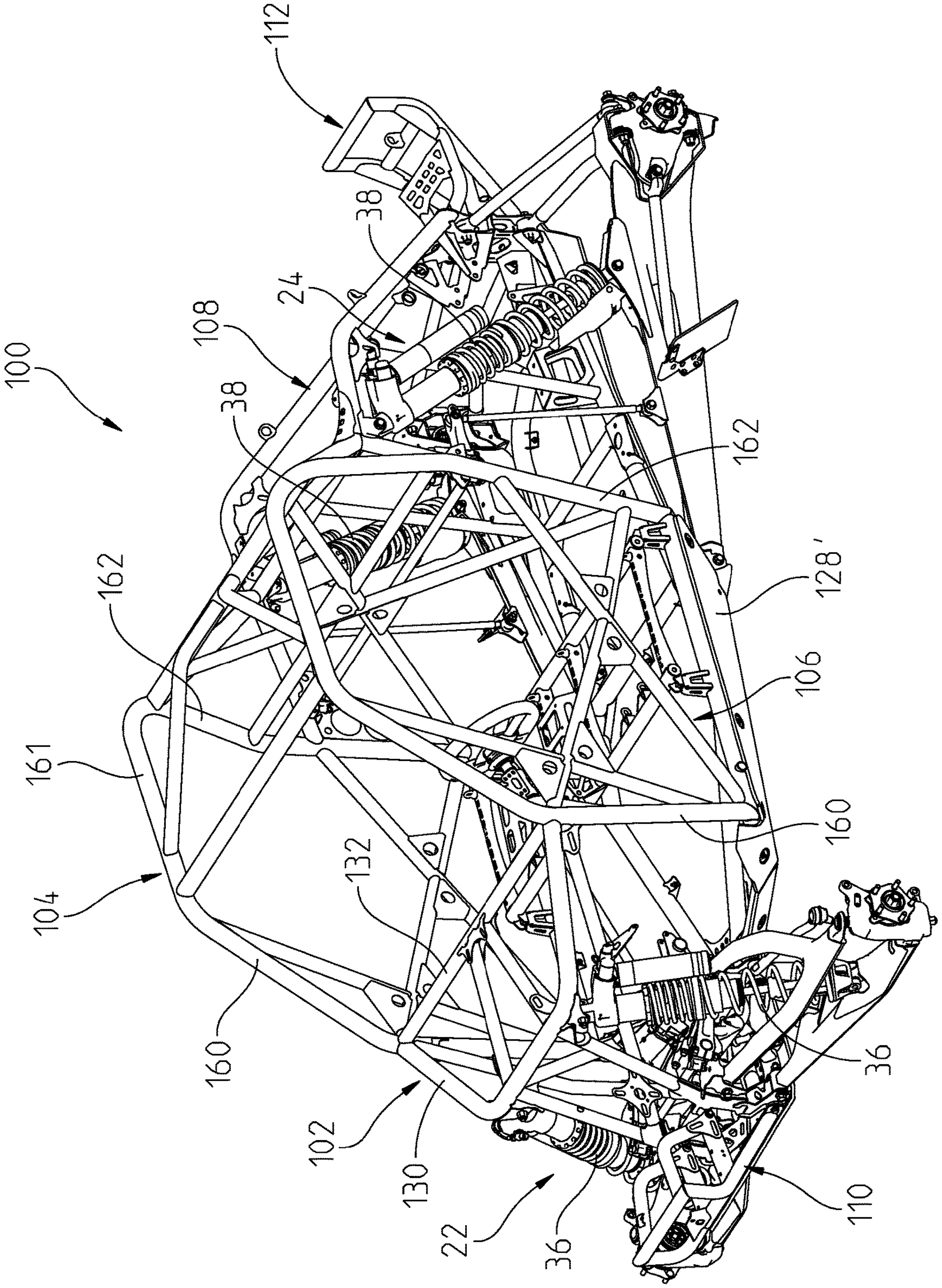
FIG. 8 is a front, left-side perspective view of a chassis of the vehicle shown in FIG. 1.

As best seen in FIG. 8, front suspension 22 is operably interposed between the front pair of ground engaging members 12 and the front section 102 of the chassis 100, and rear suspension 24 is operably interposed between the rear pair of ground engaging members 12 and the rear section 108 of the chassis 100. Front final drive 26 is supported within and contained by front section 102 of chassis 100, and is operable to transfer power from engine 20 (FIG. 11) to the front pair of ground engaging members 12. Rear final drive 28 is supported within and contained by rear section 108 of chassis 100, and is operable to transfer power from engine 20 (FIG. 11) to the rear pair of ground engaging members 12. Front and rear final drives 26, 28 may be selectively operably connected to one another via a prop shaft (not shown), based on an automatic or driver-operated selection of a 4×2 mode or a 4×4 mode.

Referring still to FIG. 8, right and left sections 104 and 106 are positioned longitudinally between the front section 102 and the rear section 108, and laterally spaced from one another. Chassis 100 defines a cab with space for an operator and driver. The cab is positioned longitudinally between front section 102 and rear section 108 of chassis 100, and laterally between right section 104 and left section 106 of chassis 100 such that the occupant(s) of the cab are fully enclosed within the cab and protected by the chassis 100 from external impacts. Driver seat 14 and passenger seat 16 are positioned within the cab of chassis 100 in a side-by-side orientation, i.e., the driver and passenger sit next to each other rather than in front and behind one another. A steering wheel 18 is provided at the driver position in front of driver seat 14.

For purposes of the present discussion, chassis 100 may be said to include various sections including front section 102, right section 104, left section 106 and rear section 108. These sections will be referenced herein for convenience, it being understood that the sections may be welded or otherwise joined into a single, whole chassis 100 in which divisions between sections may be arbitrarily made.

Figure 17:
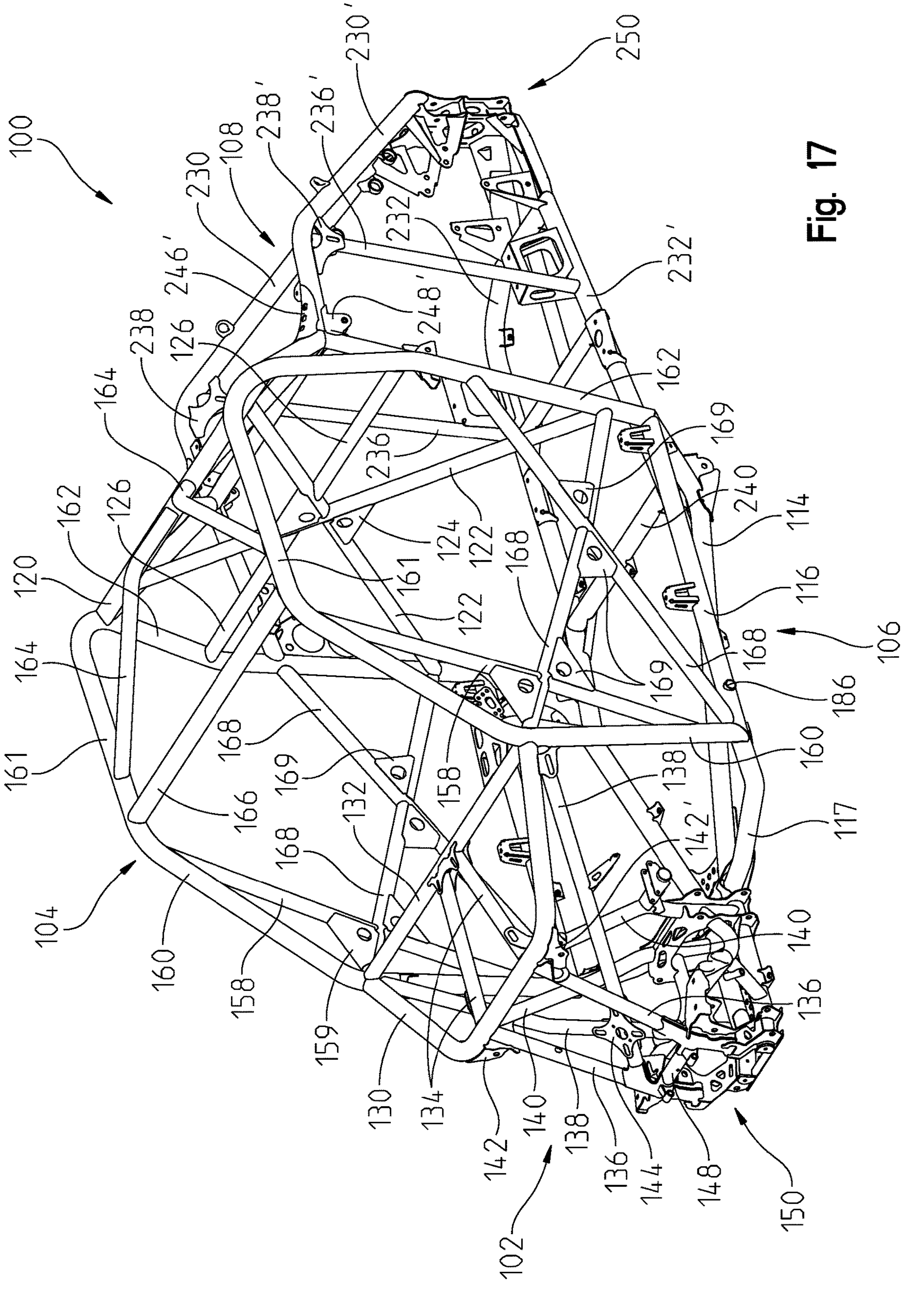
FIG. 17 is a front, right-side perspective view of a chassis of the vehicle of FIG. 1.

Chassis 100 is shown in FIGS. 17-20. Front section 102 of chassis 100, best includes a U-shaped upper tube 130 with ends connected (e.g., welded) to front cross tube 132 and to each of right and left sections 104, 106, as shown in FIG. 8. Upper stiffener tubes 134 each extend from a middle region of cross tube 132 to a front portion of upper tube 130, splaying outwardly along the rear-to-front direction as shown. Front tubes 136 extend downwardly and forwardly from the junction between stiffeners 134 and upper tube 130 to a front portion of front weldment 150, shown in FIG. 26 and further described below. Suspension brace tubes 140 extend downwardly and rearwardly from this same junction at upper tube 130 to a rear portion of front weldment 150. Tubes 134, 136 and 140 may all be welded to upper tube 130 at each of the two junctions, as shown in FIG. 17.

Additionally, right and left junction brackets 142, 142' may be provided at each such junction and may be welded to each of the tubes 130, 134, 136 and 140. Junction brackets 142 and 142' may be mirror images of one another. As described in additional detail below with respect to other junction brackets and nodes used in connection with chassis 100, junction brackets 142, 142' may serve to fixture and constrain the positions of the respective tubes 130, 134, 136 and 140 prior to, and during, the welding process. Additionally, junction brackets 142, 142' provide an upper mounting point for front shocks 36, as shown in FIG. 8.

Figure 9:
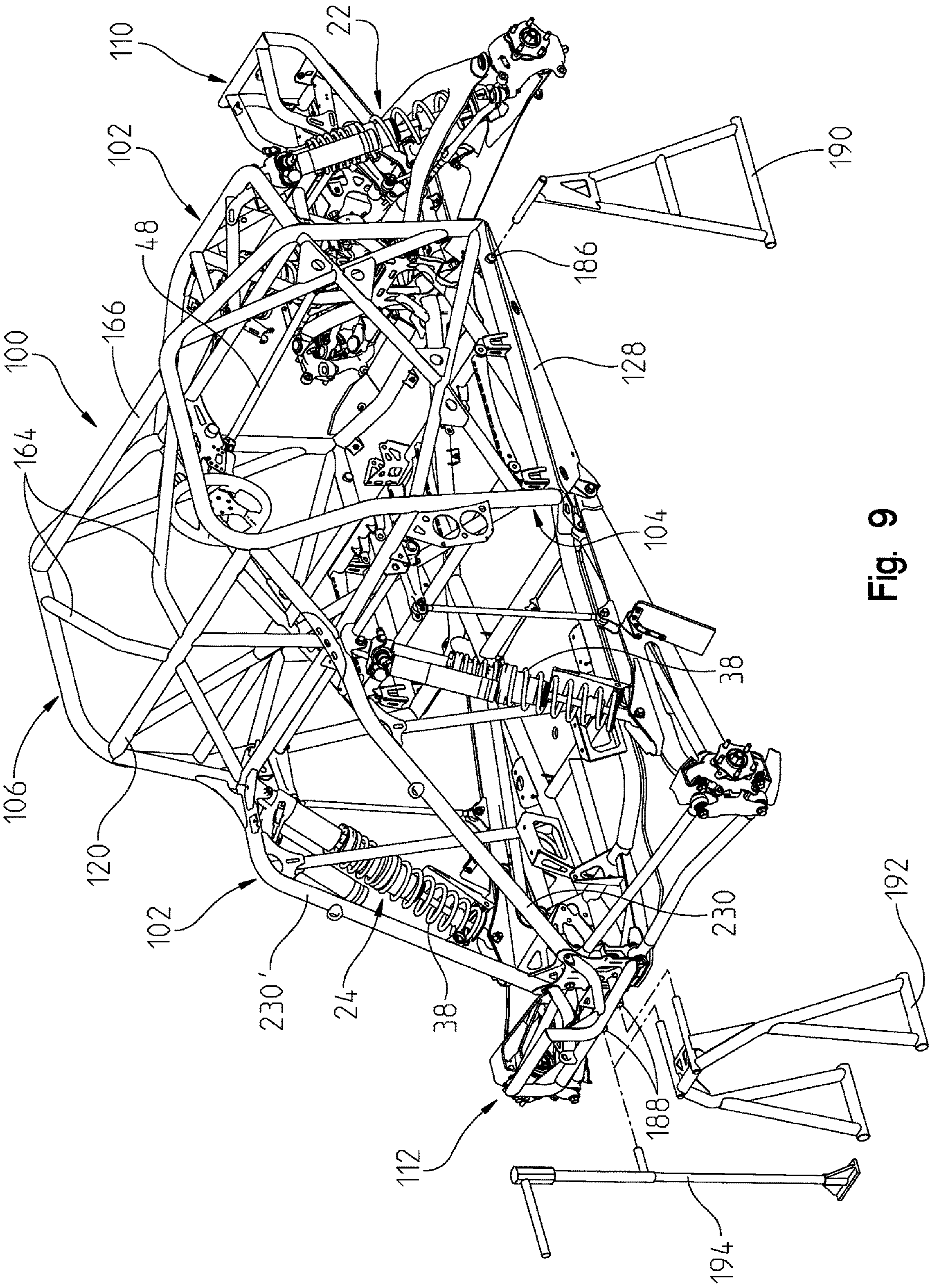
FIG. 9 is a rear, right-side perspective view of the chassis of FIG. 8, shown with various external supports.
Figure 26:
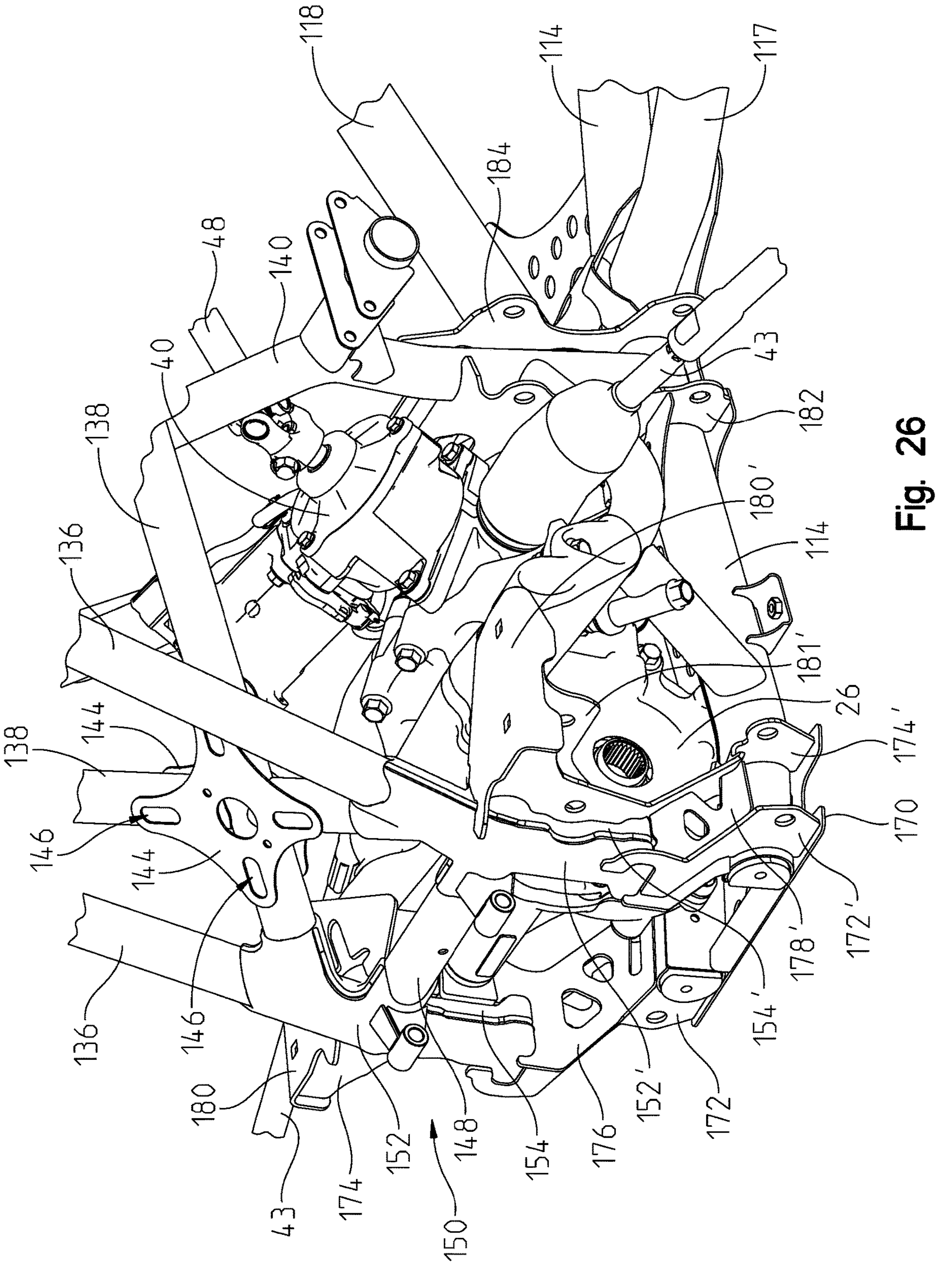
FIG. 26 is a front, left-side perspective view of a front section of the chassis of FIG. 17, shown with a front final drive and a steering mechanism in an installed position.

Front tubes 136 and suspension brace tubes 140 cooperate to form left and right shock pillars which provide a load path to A-pillars 160. As shown in FIG. 26, front tube 136 cooperates with a front portion of front weldment 150 to create a generally straight and upright load path from a lower front mounting point for front suspension 22; in particular, a front portion of a lower control arm rotatably connects to stanchion plates 172' and 174' as described herein (see, e.g., FIG. 8). A front portion of an upper control arm similarly connects along the same load path, between plates 174' and 181'. Similarly for the rear portions of the control arms, brace tube 140 provides a generally straight and upright load path from a lower rear mounting point for the lower control arm of front suspension 22; in particular, a rear portion of the control arm rotatably connects to panel plates 180 and 182 as described herein (see, e.g., FIG. 9 shown the mirror-image right side connection). A rear portion of the upper control arm similarly connects along the same load path, also between plates 180 and 182.

The upper portions of front tubes 136 and suspension brace tubes 140 are joined at their common junction with U-shaped upper tube 130, as shown in FIG. 17, such that their respective upright load paths converge at this junction. Thus, the front tube 136 and the suspension brace tube 140 combine to create a shock pillar which can efficiently transfer loads from front suspension 22 an A-pillar 160 via U-shaped upper tube 130.

Additionally, however, the X-brace formed by cross braces 138 (FIG. 17) serves as another load path from the lower-front portion of the shock pillar directly to both A-pillars 160. This provide substantial augmentation of the load path for the front shock pillars.

These augmented shock pillars are capable of absorbing and distributing substantial forces transmitted from the front ground engaging members 12 to chassis 100 via the front shocks 36. For example, front shocks 36 may experience corner events in which the left and/or right side of front suspension 22 encounters a barrier such as a rock or pothole at the ground engaging member 12. Chassis 100, and the augmented shock pillars created by front tubes 136, shock braces 140 and cross-braces 138 as joined by weldment 150 (particularly junction brackets 142, 142'), provide support sufficient to manage such large corner events without excess weight. Additionally, this arrangement contributes to an increase in overall torsional stiffness of chassis 100, particular at front section 102 and into side sections 104, 106.

Portions of front section 108 form a primary tubular assembly made of a set of interconnected quadrilateral tubular structures. An upper quadrilateral is defined by U-shaped upper tube 130 and cross tube 132, which form a trapezoid. A front quadrilateral is formed by the front portion of U-shaped upper tube 130, front tubes 136, and front weldment 150 (in particular, joiner tube 148 thereof), and is generally rectangular.

A left side of the primary tubular assembly of front section 108 is defined by a left portion of U-shaped upper tube 130, a lower portion of the left A-pillar 160, a combination of a front portion of the left outer base joiner tube 117 and a front portion of the left outer base tube 116, and a combination of a front left corner of weldment 150 and the left front tube 136. Unlike the top and front quadrilaterals which are generally planar, the left-side quadrilateral is a three-dimensional structure whose sides may take a circuitous path. A right-side quadrilateral is a mirror image of the left-side quadrilateral formed from a right portion of U-shaped upper tube 130, a lower portion of the right A-pillar 160, a combination of a front portion of the right outer base joiner tube 117 and a front portion of the right outer base tube 116, and a combination of a front right corner of weldment 150 and the right front tube 136.

Figure 31:
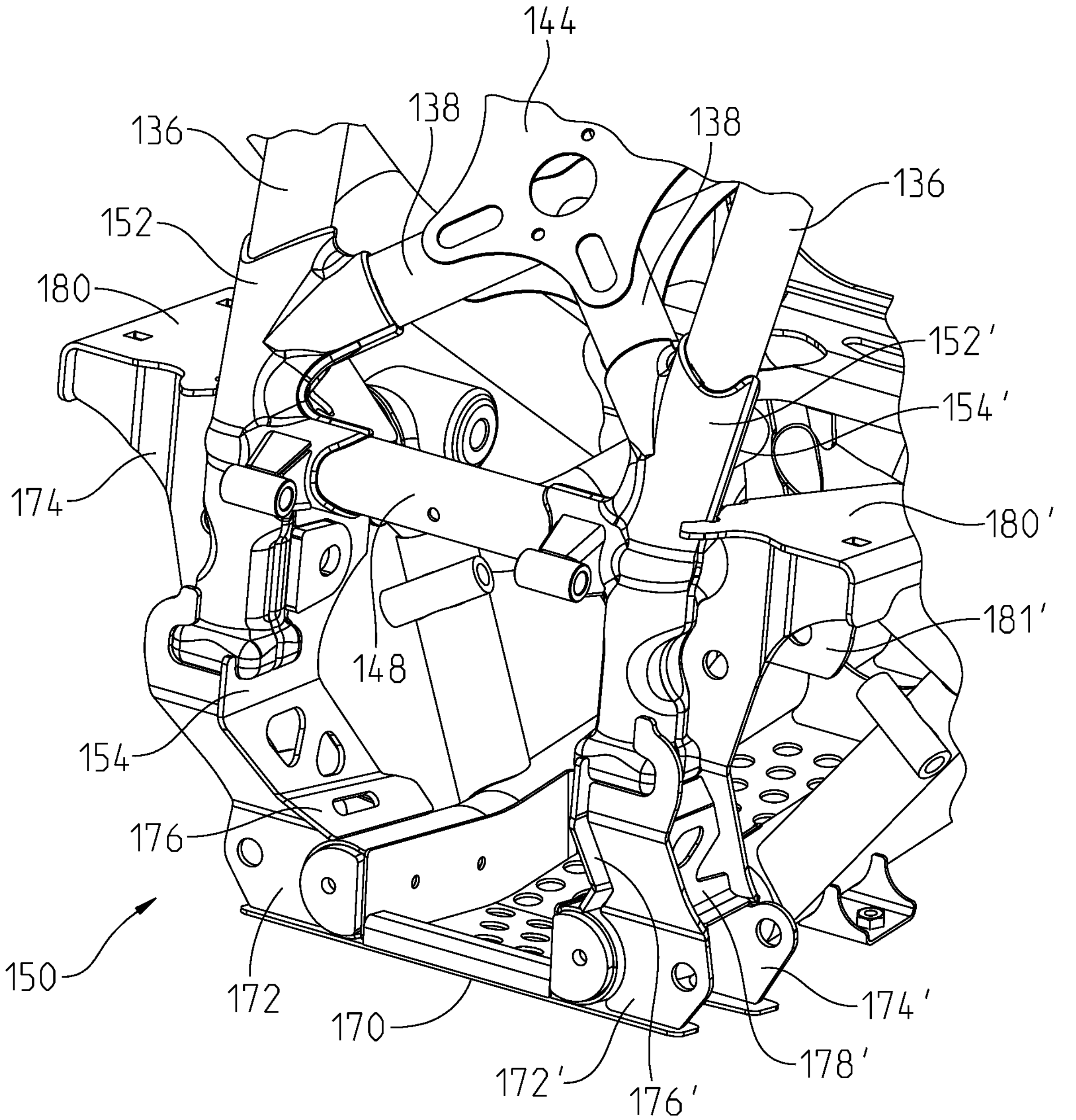
FIG. 31 is a front, left-side perspective view of a portion of the front section of the chassis of FIG. 17, illustrating tube junctions.
Figure 32:
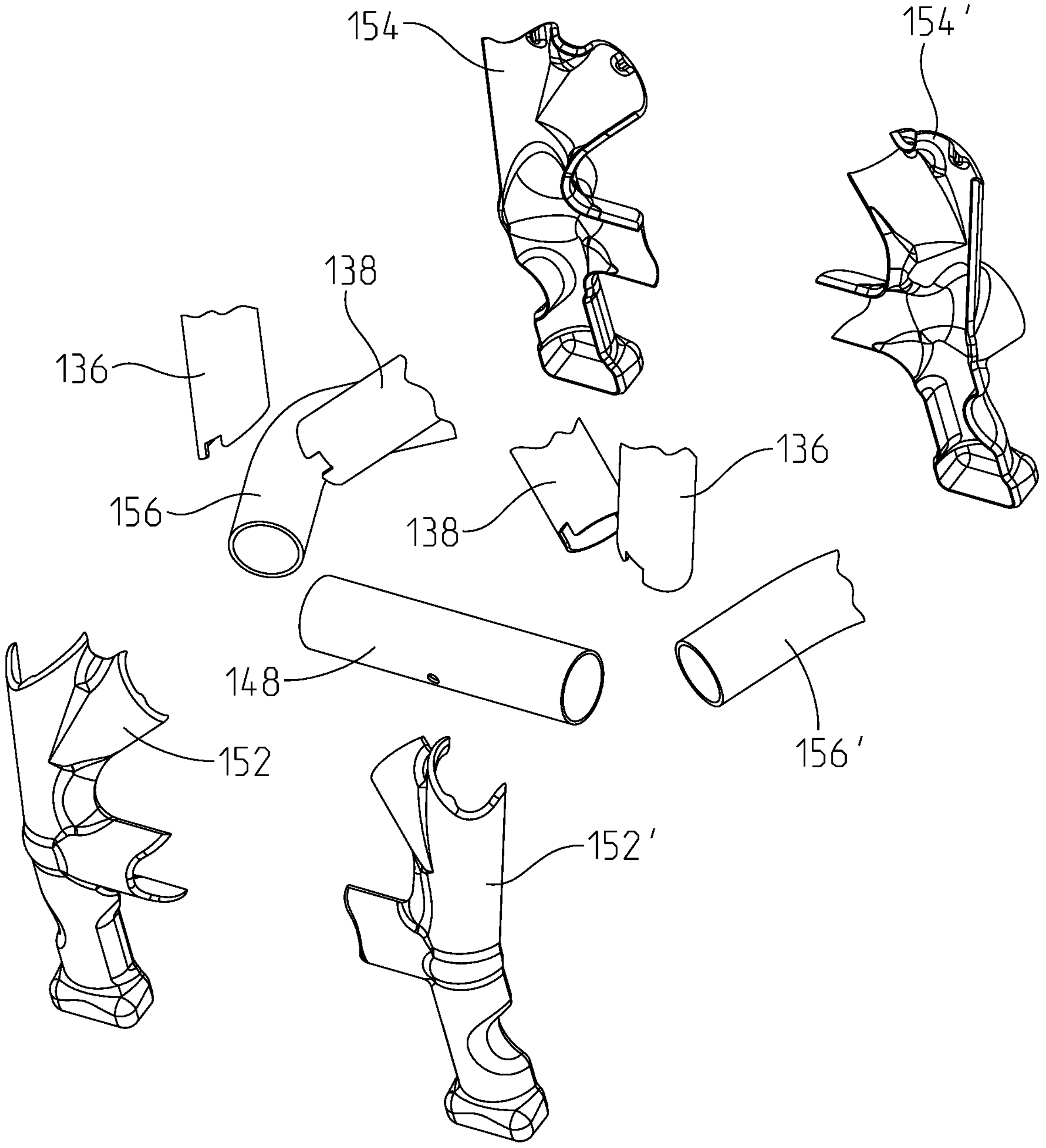
FIG. 32 is an exploded, perspective view of the portion of the front section of the chassis shown in FIG. 31.

Front section 108 of chassis 100 also includes a pair of cross braces 138 and a pair of joiner plates 144 which cooperate to form a reinforcing tubular assembly, generally in the shape of an X-brace, for further support and rigidity in the front section 102. The X-brace is contained within the outer bounds of, and fixed to, the primary tubular assembly described above. In particular, with reference to FIG. 17, each cross brace 138 extends forwardly and downwardly from a rear end at the junction between upper tube 130, cross tube 132 and A-pillar. FIGS. 26, 31 and 32 show the front end of each cross brace 138 captured between, and fixed to, clamshell braces 152, 154 as further described below.

A pair of joiner plates 144 sandwich the junction of the cross braces 138 therebetween. In the illustrative embodiment of FIG. 26, a first one of the cross braces 138 extends continuously across the joiner plates 144, while a second one of the cross braces 138 is cut, abutted and fixed (e.g., welded) to the first cross brace 138 to create the X-shaped junction therebetween. This X-shaped junction is further reinforced by affixing each of the pair of joiner plates 144 to the respective abutting surfaces of the cross braces 138 to create a rigid structure capable of absorbing and distributing forces along various vectors, contributing to high overall levels of strength and stiffness for front section 102 and the larger chassis 100. Joiner plates 144 may have a series of apertures, such as four oblong apertures 146 as shown, through which welding to the underlying tube surface may be accomplished.

The tubing members of chassis 100 described above cooperate with front weldment 150 to create a stiff and strong overall front section 102 which also contains, protects and supports front final drive 26. A front node for connecting a series of tubes is provided by clamshell braces 152, 154, as best seen in FIGS. 31 and 32. The right-side front clamshell brace 152 is a mirror image of the left-side front clamshell brace 152', and the right-side rear clamshell brace 154 is a mirror image of the left-side rear clamshell brace 154'. The left front and rear pair of braces 152, 154 cooperate to define four tube receivers configured and positioned to receive the left front tube 136 and left cross brace 138 (described above), as well as a left end of joiner tube 148 and a left steering rack cradle tube 156 (described below). The right pair of braces 152', 154' similarly define four tube receivers for the right counterpart tubes 136, 138 and 156', and the right end of joiner tube 148.

Braces 152, 154, 152', 154' may all be made as tight-tolerance, high-precision parts, such as by machining from billet material, casting or forging as may be required or desired for a particular application. When the respective tubes are clamped between respective pairs of braces 152, 154 or 152', 154', the position and orientation of the tubes is constrained by the tube receivers into the desired position and orientation. In this way, braces 152, 154, 152', 154' act as a fixture which facilitates accurate spatial relationships between the tubes connected thereto, as well as a structural component after the connections are fixed. The fixation of the connections may be achieved with welding around the junctions between the tube receivers defined by the braces 152, 154 or 152', 154' and the adjacent tubes, as well as along the seams formed between adjacent front and rear braces 152, 154 or 152', 154'.

Figure 19:
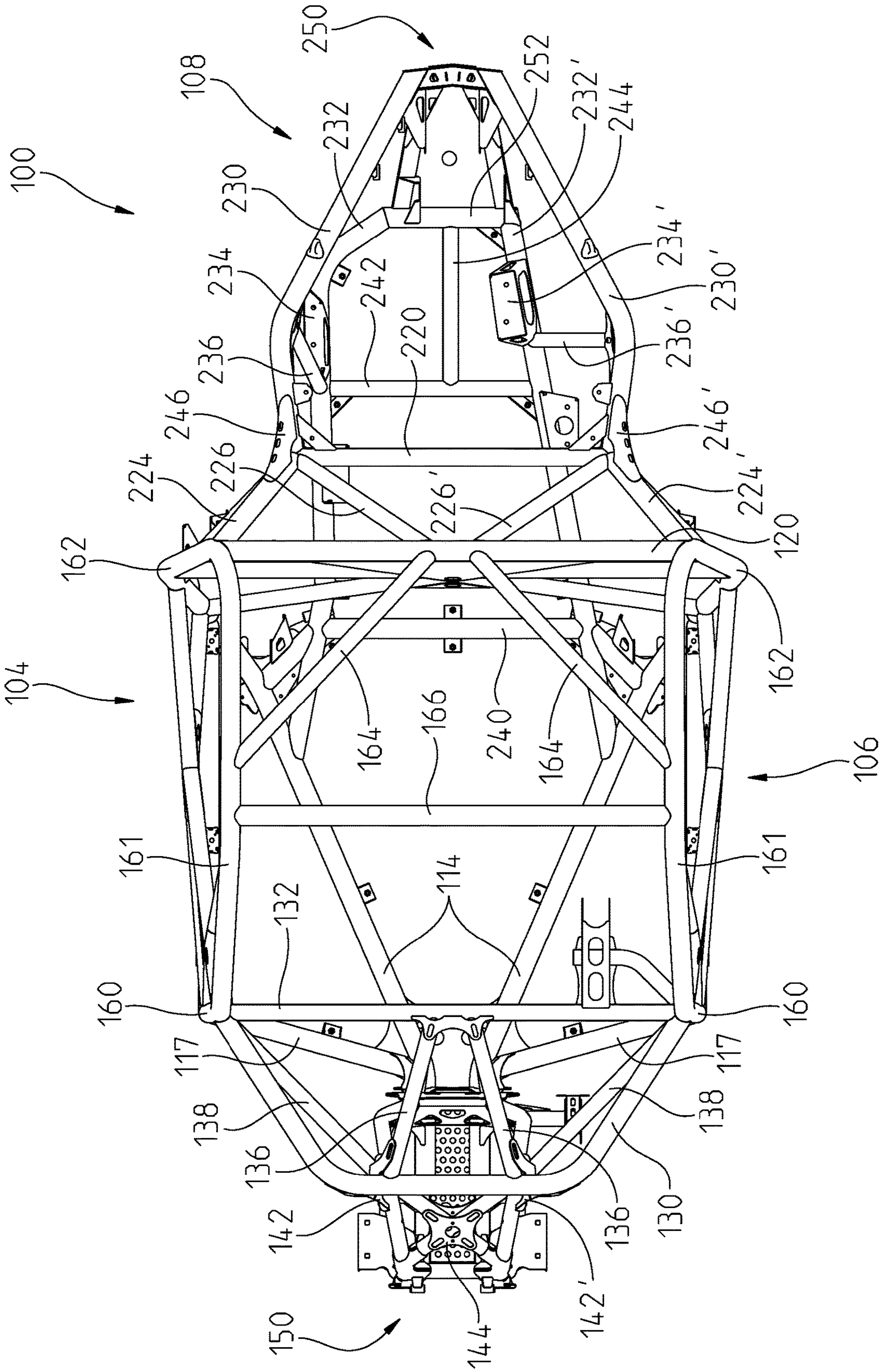
FIG. 19 is a top plan view of the chassis of FIG. 17.

As best seen in FIG. 31, a complete lower triangle is defined by an upper edge of front weldment 150, illustratively joiner tube 148, and the lower portions of cross braces 138, as connected by braces 152, 154, 152', 154' at the lower triangle corners and by joiner plates 144 at the upper triangle corner. It is contemplated that in some applications, the lower corners of the lower triangle could be connected by welding tubes 138 and 148 directly to one another. A second, larger complete upper triangle, best seen in FIG. 19, is defined by front cross tube 132 and the upper portions of cross braces 138, as connected by the junctions at A-pillars 160 at the upper triangle corners and by joiner plates 144 at the lower triangle corner. This creates two interconnected triangles defined by the X-shaped brace formed by cross braces 138 which are integrated into various load paths through front section 102, creating redundancy and effective load sharing among the various load-bearing members of front section 102 and the rest of chassis 100. This load sharing contributes to the high strength and stiffness of chassis 100.

The pairs of braces 152, 154 and 152', 154' are integrated and fixed (e.g., welded) into the larger structure of front weldment 150, which uses a series of interconnected plates to create a rigid, lightweight structure capable of absorbing and distributing the many forces associated with steering and driving the front ground engaging members 12 (FIG. 1) and supporting and protecting the front of vehicle 10. The front portion of weldment 150 includes a right stanchion with four plates 172, 174, 176, 178 which cooperate to form a box-like structure. In particular, front plate 172 is connected to rear plate 174 by inside plate 176 and outside plate 178, all of which may be welded to one another. The upper portion of the stanchion receives the clamshell braces 152, 154, which is welded to respective ones of the stanchion plates 172, 174, 176, 178, while the lower portion of the stanchion is fixed (e.g., welded) to the front-right corner of base plate 170. A left stanchion is a mirror image of the right stanchion, and includes stanchion plates 172', 174', 176', 178' which are connected to adjacent left-side structures in the same manner.

An upper plate 180) also interconnects clamshell braces 152, 154 and rear stanchion plate 174, with a mirror-image upper plate 180' similarly connecting braces 152', 154' and rear stanchion plate 174'. Fixed (e.g., welded) to upper plate 180 is a further plate 181, which cooperates with plate 174 to create an upper, right, front suspension mounting point (FIG. 8). The corresponding lower, right, front suspension mounting point is defined by plates 172 and 174. Front left mounting points are similarly defined by the corresponding plates 180', 181', 172' and 174'. Upper plate 180 includes interfacing features (e.g., apertures) designed to receive an anti-roll bar (ARB) of the front suspension 22. As best seen in FIG. 26, this ARB upper plate 180 is positioned next to, and abutting, clamshell braces 152, 154 such that plate 180 is generally along vertical the load path of front tube 136. This, in turn creates efficient and effective load dispersal from the anti-roll bar to the larger structures of chassis 100

At the rear portion of base plate 170, two additional plates 182 and 184 (FIG. 26) span the left-to-right span of the base plate 170 and create upper and lower rear mounting points at both the left and right sides of front weldment 150 (FIG. 8). As shown in FIG. 26, the rear panel plate 184 provides a point of fixation (e.g., welding) for the front end of inner base tubes 114, outer base joiner tubes 117 and A-pillar support 118, thereby providing interconnection between front section 102 and right and left sections 104 and 106 of chassis 100 as further discussed below. In particular, the front portion of inner base tubes 114 pass through plates 182, 184, along the outer edges of base plate 170, and along the inner surfaces of the front stanchions described above. The lower portion of suspension brace tubes 140 also pass downwardly between plates 182, 184 to a junction with inner base tube 114, as shown in FIGS. 17 and 26. All junctions between these various components, or any combination of such junctions, may be welded to provide firm fixation.

Figure 21:
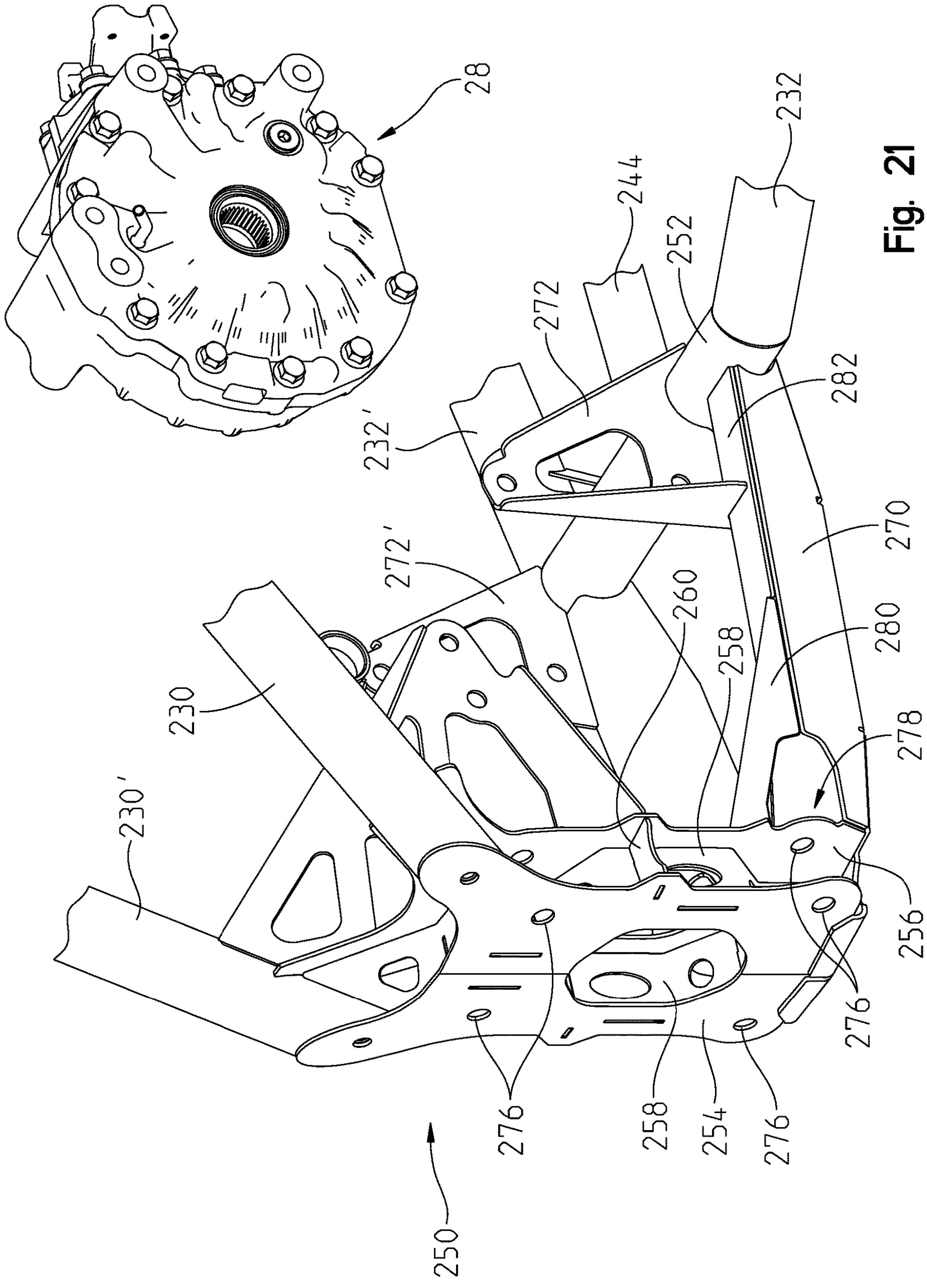
FIG. 21 is a rear, left-side perspective view of a rear weldment of the chassis of FIG. 17, shown with a rear final drive.

Referring still to FIG. 26, plates 182, 184 span the lateral width of weldment 150) such that load originating at the right side of weldment 150 can be distributed across the entire width and to other portions of chassis 100, and vice-versa. Additionally, plates 182 and 184 stand upright and substantially parallel to each other and are spaced longitudinally, similar to plates 254 and 256 of rear weldment (FIG. 21). This arrangement provides a rigid box-like structure which effectively spreads and distributes loads from the control arms of front suspension 22 in a similar manner to plates 254, 256 as further described below.

Figure 27:
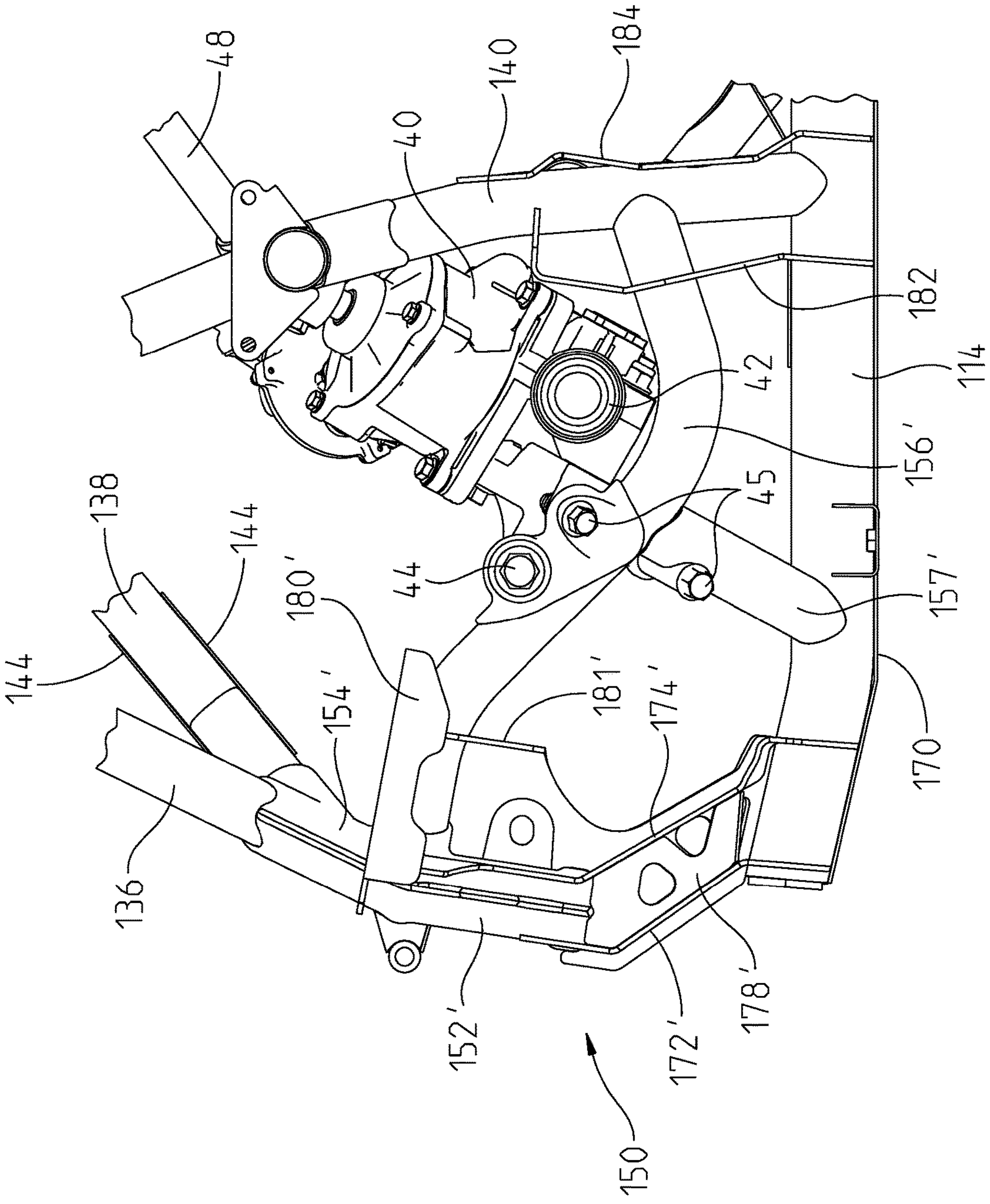
FIG. 27 is a left-side, elevation view of the front section shown in FIG. 26, illustrating the steering mechanism in the installed position.
Figure 28:
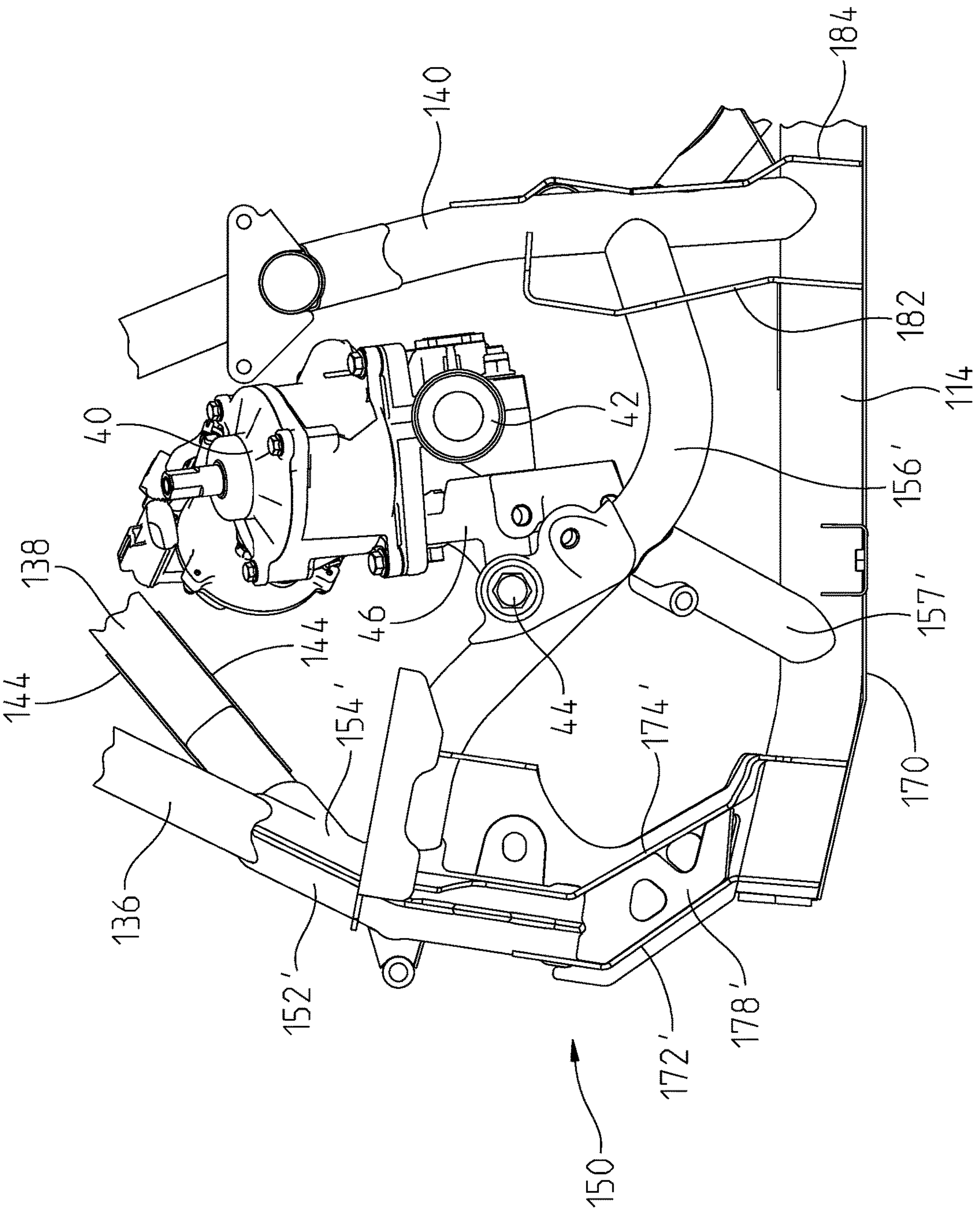
FIG. 28 is a left-side, elevation view of the front section shown in FIG. 26, illustrating the steering mechanism rotated into a removal position.
Figure 29:
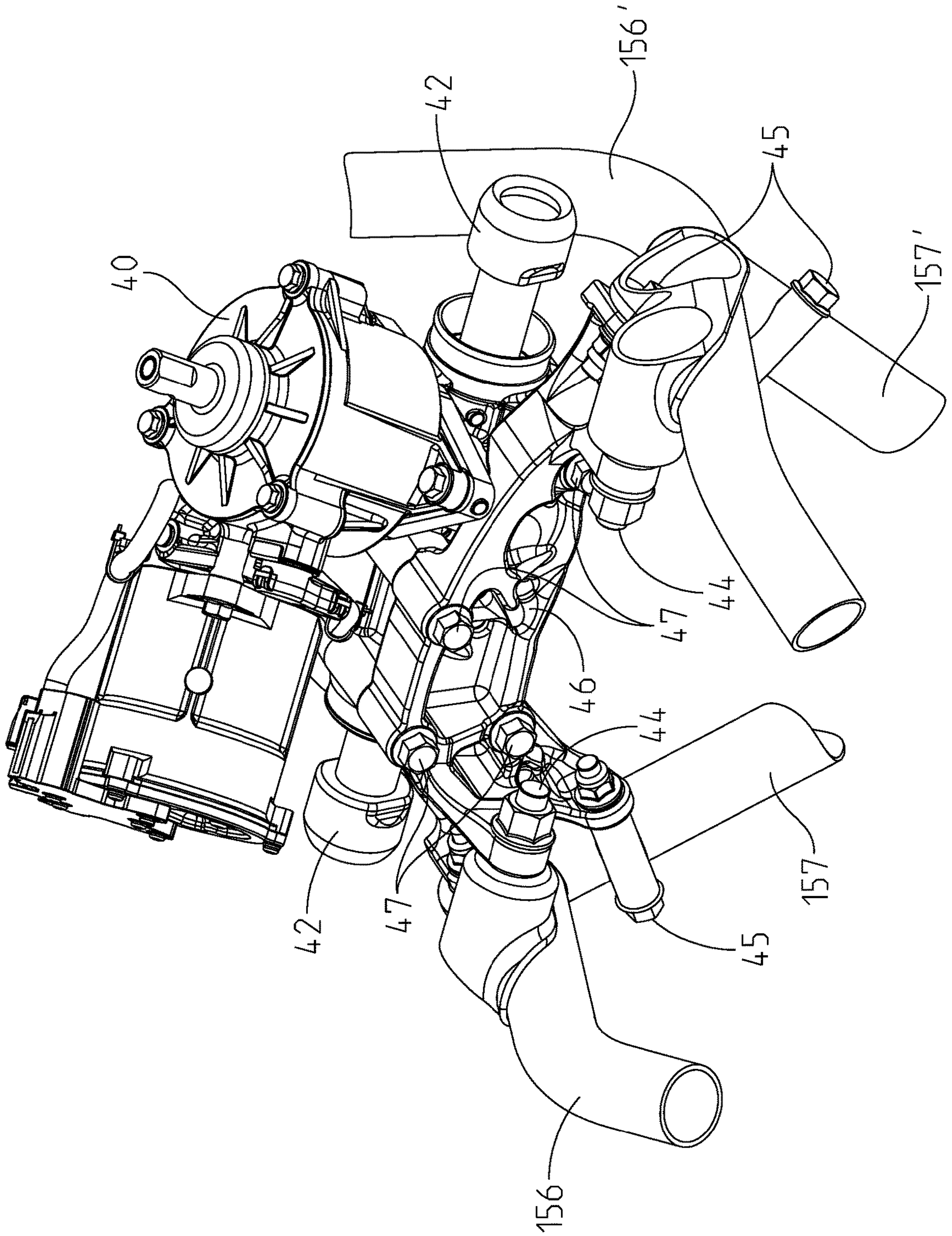
FIG. 29 is a perspective view of the front section and steering mechanism of FIG. 28.
Figure 30:
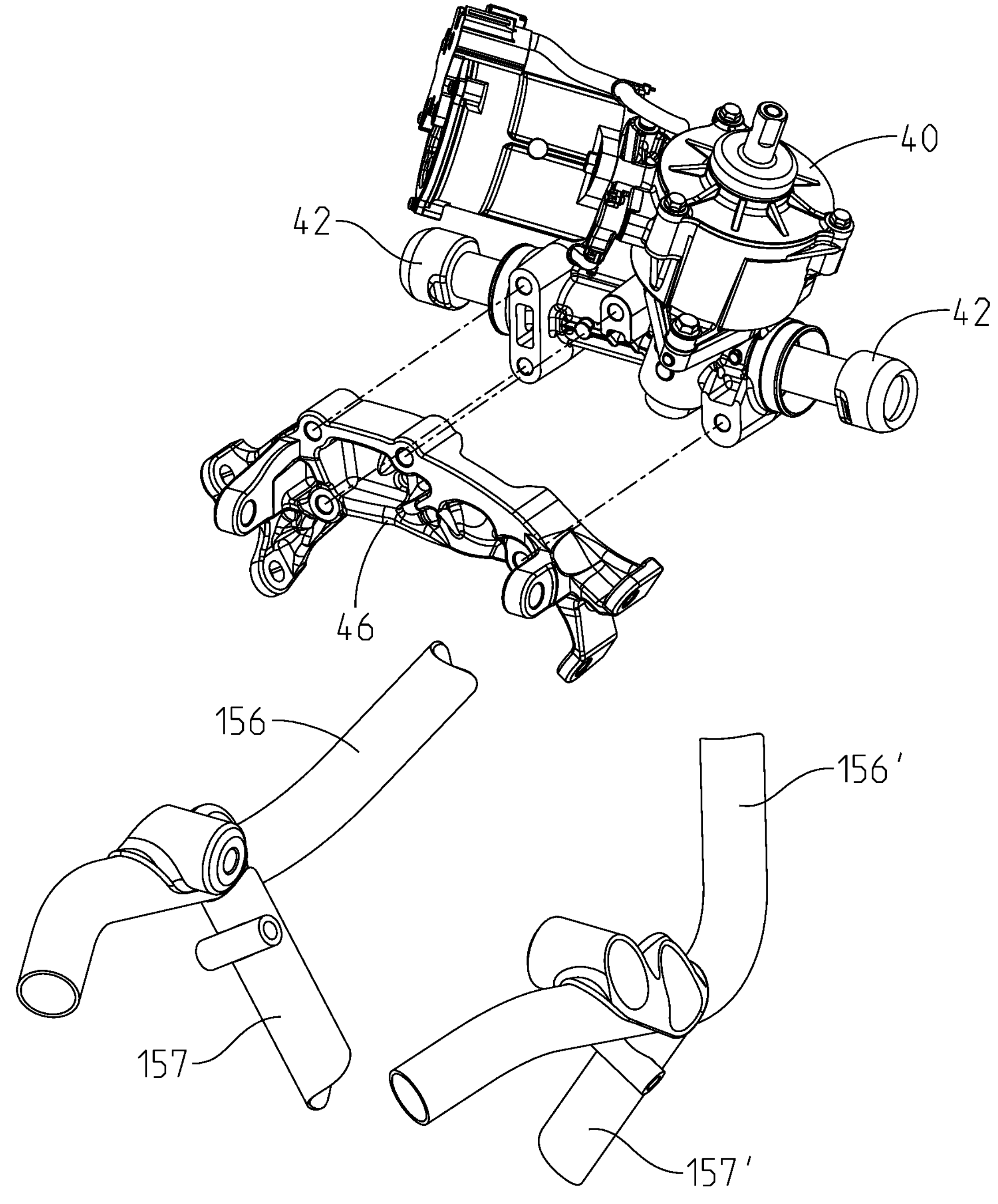
FIG. 30 is an exploded, perspective view of the front section and steering mechanism of FIG. 28.

Turning now to FIGS. 26-30, steering rack bulkhead 40 is shown positioned within front section 102 of chassis 100. FIG. 29 shows bulkhead 40 affixed to chassis 100 via steering rack base 46, which is rotatably coupled to the right and left steering rack cradle tubes 156, 156' via pivot bolts 44 and affixed to cradle supports tubes 157, 157' via securement bolts 45. In FIG. 27, bulkhead 40 is secured in its use position by pivot bolts 44 and securement bolts 45. In FIG. 28, securements bolts 45 are removed to allow bulkhead 40 to be rotated into a service position about pivot bolts 44. Steering rack cradle tubes 156, 156' include a downward-sloping bend which creates a right lateral opening between tubes 156, 138 and 140 and a corresponding left lateral opening between tubes 156', 138' and 140' (FIG. 27). This lateral opening is large enough to allow steering rack bulkhead 40 to be withdrawn laterally out of chassis 100 through either the left or right lateral opening.

This configuration allows steering rack bulkhead 40 to be serviced with minimal removal of other components. In particular, with ground engaging members 12 and front suspension 22 removed, tie rods 43 (FIG. 26) can be withdrawn from steering rack 42 (FIG. 29). All four of the securement bolts 45 may then be removed with access by tools and the serviceperson's hands facilitated by the opening afforded by the shape and location of steering rack cradle tubes 156, 156'. With securement bolts 45 removed, both steering rack bulkhead 40 and base 46 can be rotated from the position shown in FIG. 27 to the position shown in FIG. 28. At this point, base bolts 47 may be removed to disconnect steering rack bulkhead 40 from rack base 46, which may also accomplished by passing tools and/or hands through the lateral openings. Steering rack bulkhead 40 may then be withdrawn laterally to the right or left. Alternatively, pivot bolts 44 may be removed instead of base bolts 47, and both bulkhead 40 and base 46 may be removed together while still connected. In connection with this alternative method, it is contemplated that base 46 and bulkhead 40 could be permanently fixed to one another, or formed as a single unitary part.

As shown in FIG. 29, four base bolts 47 are provided to connect base 46 and bulkhead 40 to chassis 100. This set of four bolts 47, arranged in a quadrilateral pattern as shown, arrest rotation and hinging action which might otherwise be induced by forces on base 46 during operation of vehicle 10.

A second removal method may be employed for service of steering rack bulkhead 40. In this method, steering rack base 46 is left fixed to chassis 100 by bolts 44 and 45, but base bolts 47 are removed to disconnect steering rack bulkhead 40 from rack base 46. Steering rack bulkhead 40 may then be withdrawn along a substantially vertical path between the suspension brace tubes 140.

For any removal method, steering shaft 48 (FIGS. 9 and 26) is first removed from steering rack bulkhead 40. However, the removal methods discussed above do not require removal of the front final drive 26 (FIG. 26) for service of the steering rack bulkhead 40. While known vehicles may only allow steering rack bulkheads to be removed through the bottom of the vehicle (and through the space occupied by a front final drive), the configuration of front section 102 of chassis 100 offers simplified service protocols by facilitating access and withdrawal through the sides or from the top.

Figure 18:
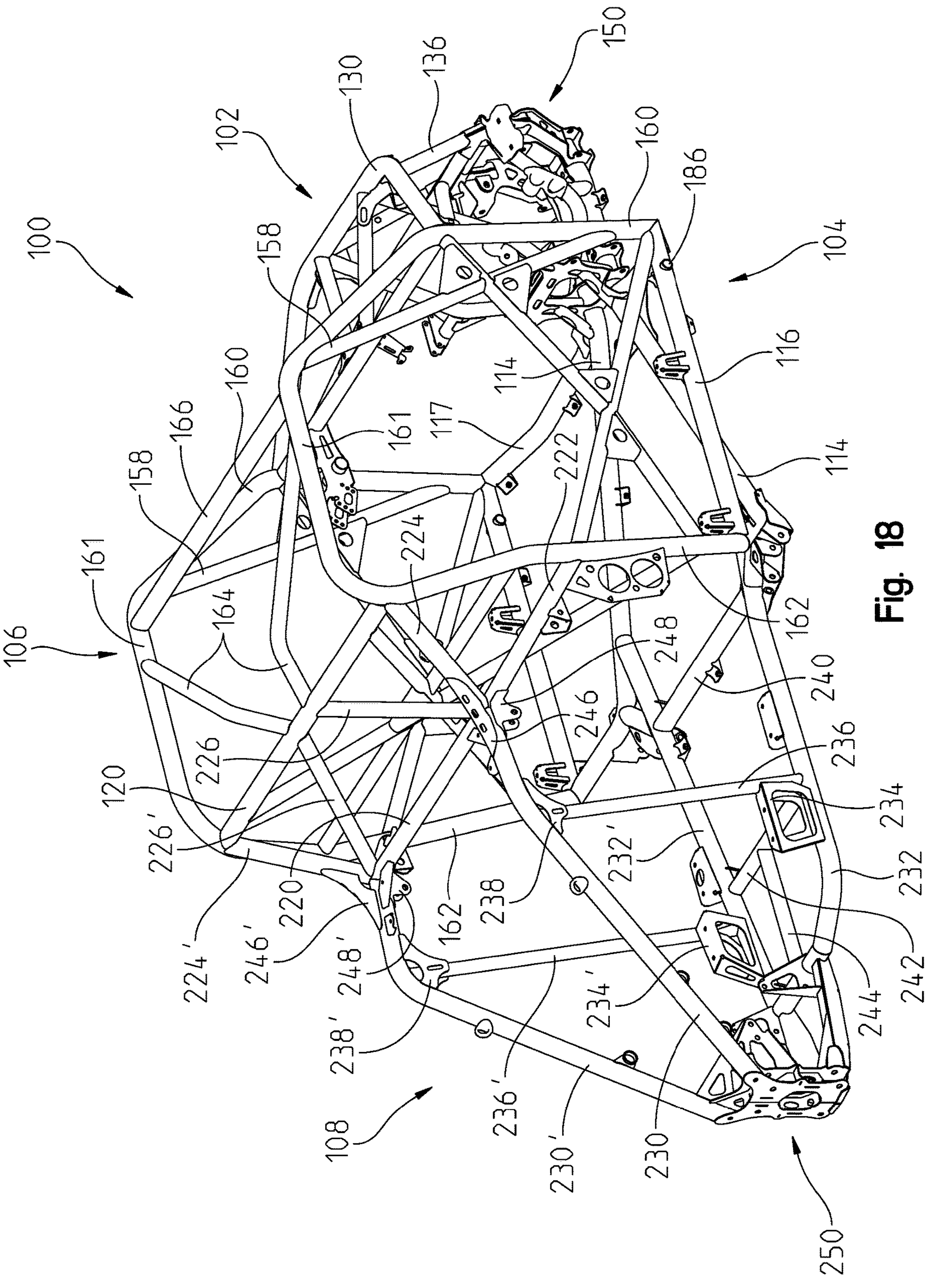
FIG. 18 is a rear, left-side perspective view of the chassis of FIG. 17.

Rear section 108 of chassis 100 also offers high-strength, high-stiffness features in a lightweight assembly. As best seen in FIG. 18, rear section includes an arrangement of tubular components joined at various junctions to define a series of triangles. The front portion of rear section 108 meets the right and left sections 104, 106 of chassis 100 generally along their respective B-pillars 162, while the rear portion of rear section 108 is joined by rear weldment 250, as described in further detail below.

Figure 20:
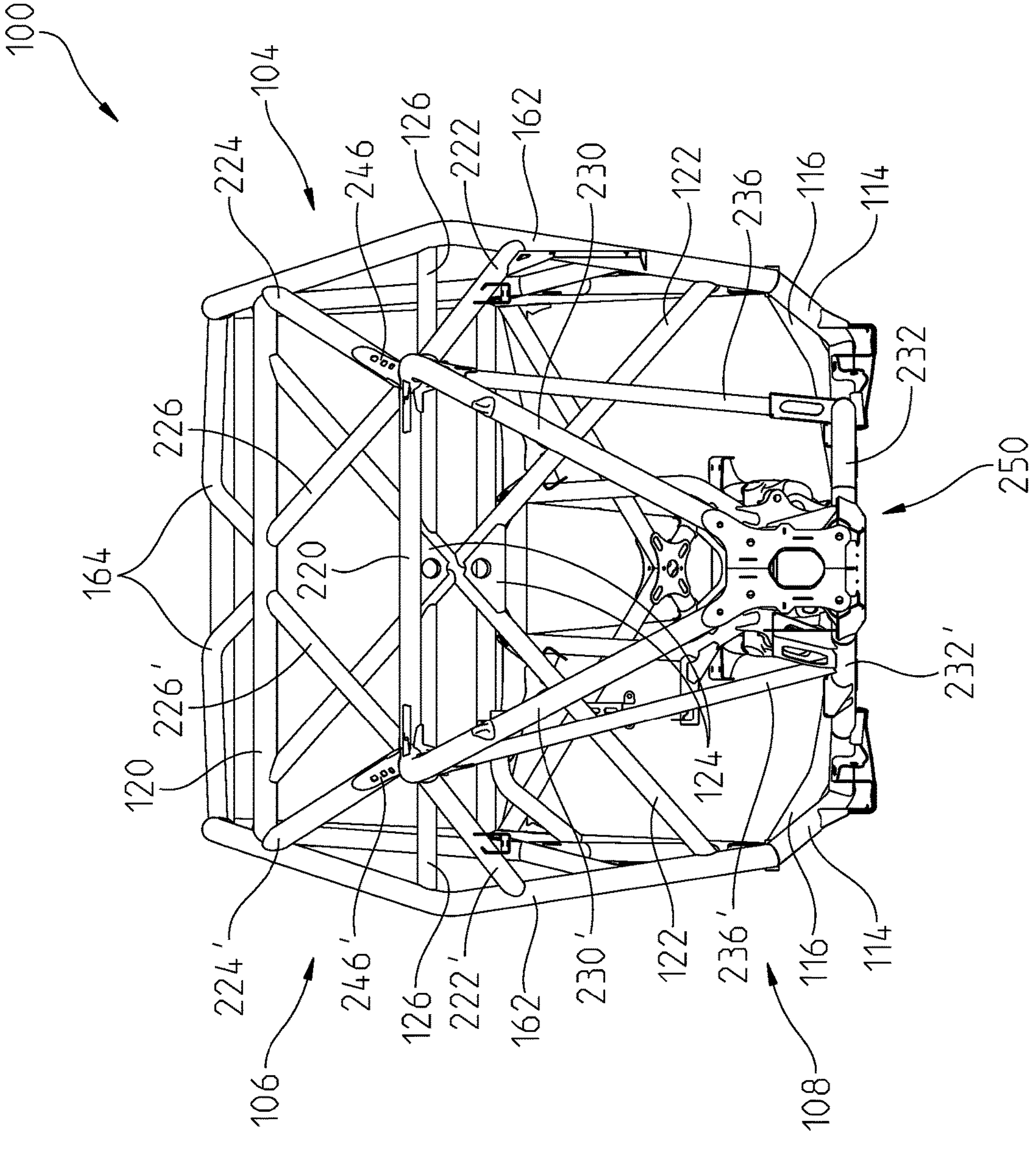
FIG. 20 is a rear elevation view of the chassis of FIG. 17.

Referring now to FIGS. 18-20, upper right frame tube 230 extends forwardly and upwardly along a substantially straight path to joiner components 246 and 248, which distribute forces transmitted to and from frame tube 230 to multiple additional frame tubes. The "substantially straight" path has only a single bend of less than 30 degrees. Upper left frame tube 230' takes a similar path and has similar junctions as right frame tube, and discussion of the orientation and connections of frame tube 230 apply equally to frame tube 230' and vice-versa.

Figure 24:
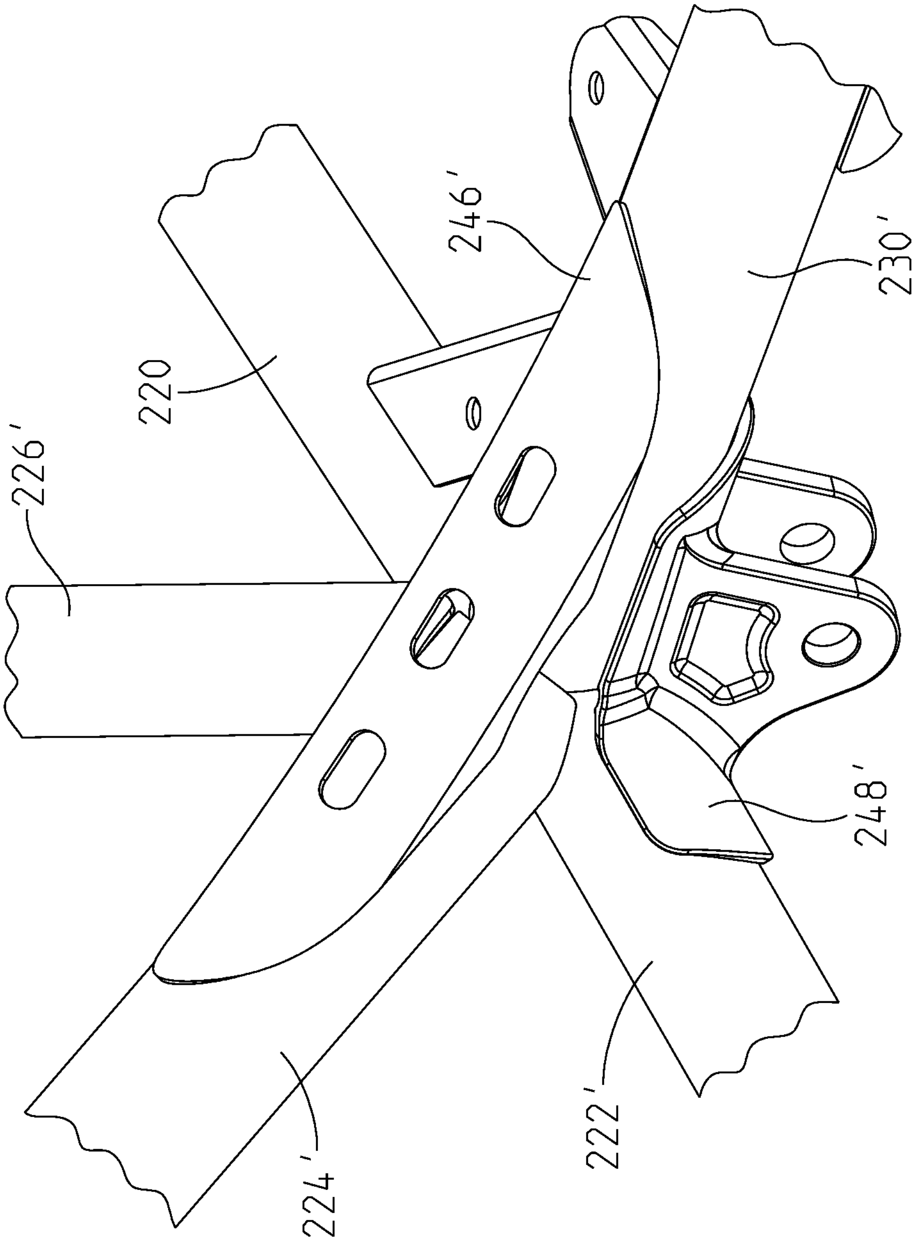
FIG. 24 is an enlarged perspective view of a portion of the chassis of FIG. 17, illustrating a tube junction.
Figure 25:
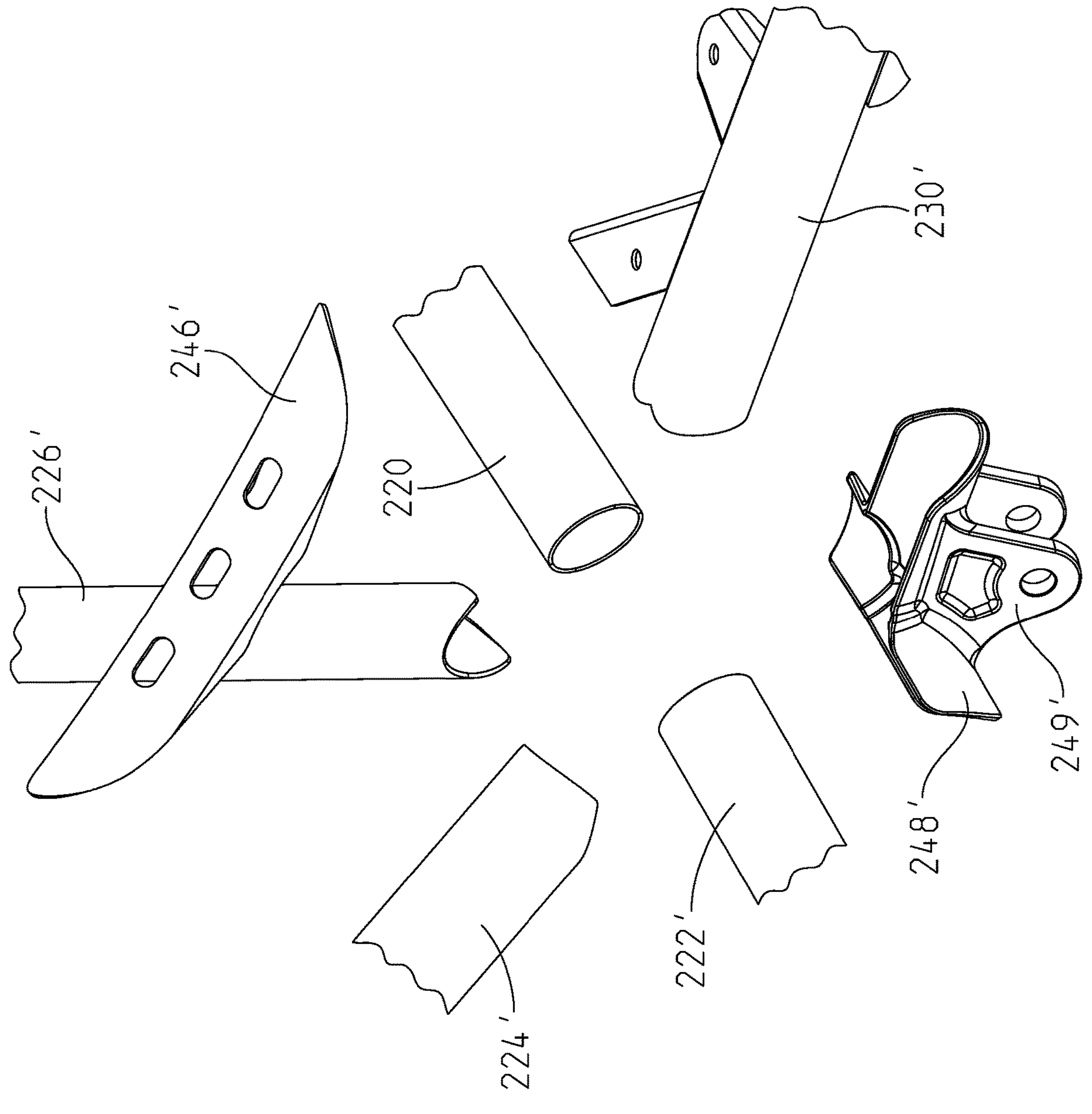
FIG. 25 is an exploded perspective view of the tube junction shown in FIG. 24.

As shown in FIGS. 24 and 25, frame tube 230' forms a junction with four other frame tubes extending laterally and/or forwardly: cross brace 220, lower pillar brace 222', upper pillar brace 224', and cross brace joiner 226' Cross brace 220 extends along a lateral (i.e., left-to-right) and generally horizontal path to from the junction with left frame tube 230' to the junction with the right frame tube 230. Lower pillar brace 222' extends forwardly, outwardly and downwardly to a junction with a mid-portion of B-pillar 162

(FIG. 20). Upper pillar brace 224' extends forwardly, outwardly and upwardly to a junction with an upper portion of B-pillar 162 (FIG. 20) and upper cross brace 120, which also extends along a lateral (i.e., left-to-right) and generally horizontal path between the tops of the B-pillars 162. Cross brace joiner tube 226' extends upwardly, inwardly and forwardly to a center portion of the upper cross brace 120. Each of the tubes 220, 222', 224' and 226', and the right-side counterparts 222, 224, 226, form a series of generally triangular structures with their neighboring tubes for strength and stiffness in the forward portion of rear section 108, as variously illustrated in FIGS. 18-20.

Fixation between upper frame tube 230' and tubes 220, 222', 224' and 226' at the junction therebetween is facilitated and strengthened by upper joiner component 246' and lower joiner component 248'. As shown in FIG. 25, lower joiner 248' includes cradles sized and configured to receive and interfit with tubes 230', 220 and 222'. For purposes of the present discussion, "interfitting" components are components designed to make surface contact with one another, rather than merely line- or point-contact. Lower joiner 248' may be a machined component made from a billet of material, such that its tube cradle portions define the desired relative orientations of tubes 230', 220 and 222' upon assembly. In this way, lower joiner 248' acts as a jig or fixture for tubes 230', 220 and 222' which ensures that these tubes are oriented properly relative to one another prior to fixation (e.g., welding) within the larger structure of rear section 108 of chassis 100.

Additionally, joiner component 248' includes a clevis portion 249' configured and oriented to act as a clevis for receiving the top of a rear shock 38 (FIG. 9). This clevis 249' provides two arms for double-shear support of the rear shock 38. Joiner component 248' provides a large cross-sectional area at the junction or node between tubes 230', 220, 222', 224' and 226' to ensure high strength and stiffness at the highest-stress portions of the junction.

Upper joiner component 246' similarly includes rear and forward cradles sized and configured to receive and interfit with tubes 230' and 224, respectively. Like lower joiner 248', upper joiner 246' may be a machined component made from a billet of material, such that its tube cradle portions define the desired relative orientations of tube 224' relative to tube 230' upon assembly. In this way, upper joiner 246' also acts as a jig or fixture for tube 224' relative to tube 230', while also strengthening the junction or node therebetween.

Lower frame tubes 232, 232', most clearly shown in FIGS. 18 and 19, extend forwardly and generally horizontally from rear weldment 250 to a junction with inner base tubes 114 below the cab area of chassis 100. Front cross brace 240 and rear cross brace 242 each extend laterally (e.g., left-to-right) and generally horizontally between lower frame tubes 232, 232'. A further brace 244 extends longitudinally (e.g., front-to-back) and generally horizontally between rear cross brace 242 and weldment 250, particularly cross brace 252 thereof. Motor mounts 234, 234' are fixed (e.g., welded) to frame tubes 232, 232' respectively at a position rear of rear cross brace 252. An engine 20 (shown schematically in FIG. 11 and discussed further below) can be mounted to motor mounts 234, 234', which may be spatially accommodated between upper frame tubes 230, 230', particularly in the widened space afforded by the slight bends in tubes 230 and 230' described above.

Figure 22A:
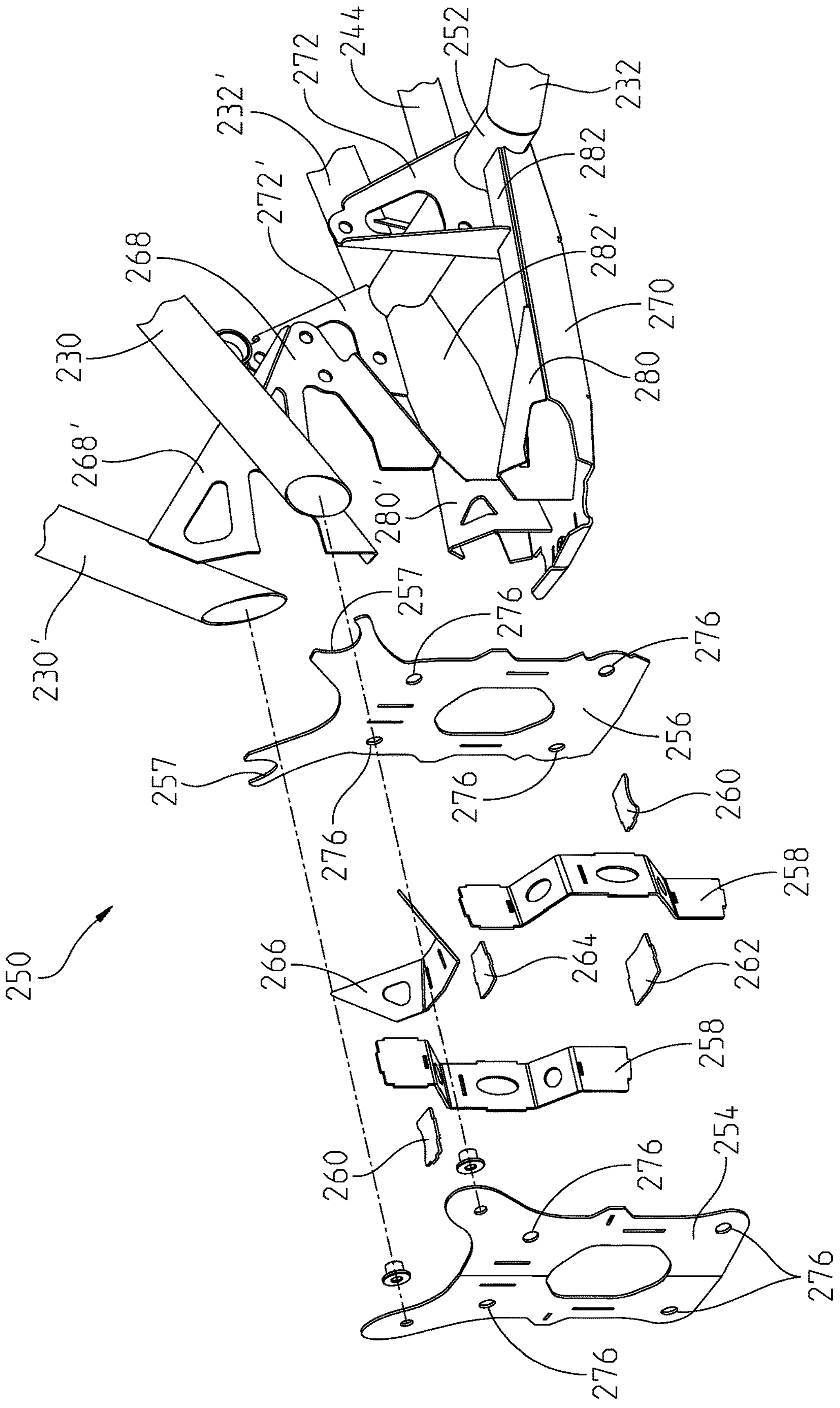
FIG. 22A is a perspective exploded view of the rear weldment of FIG. 21.
Figure 22B:
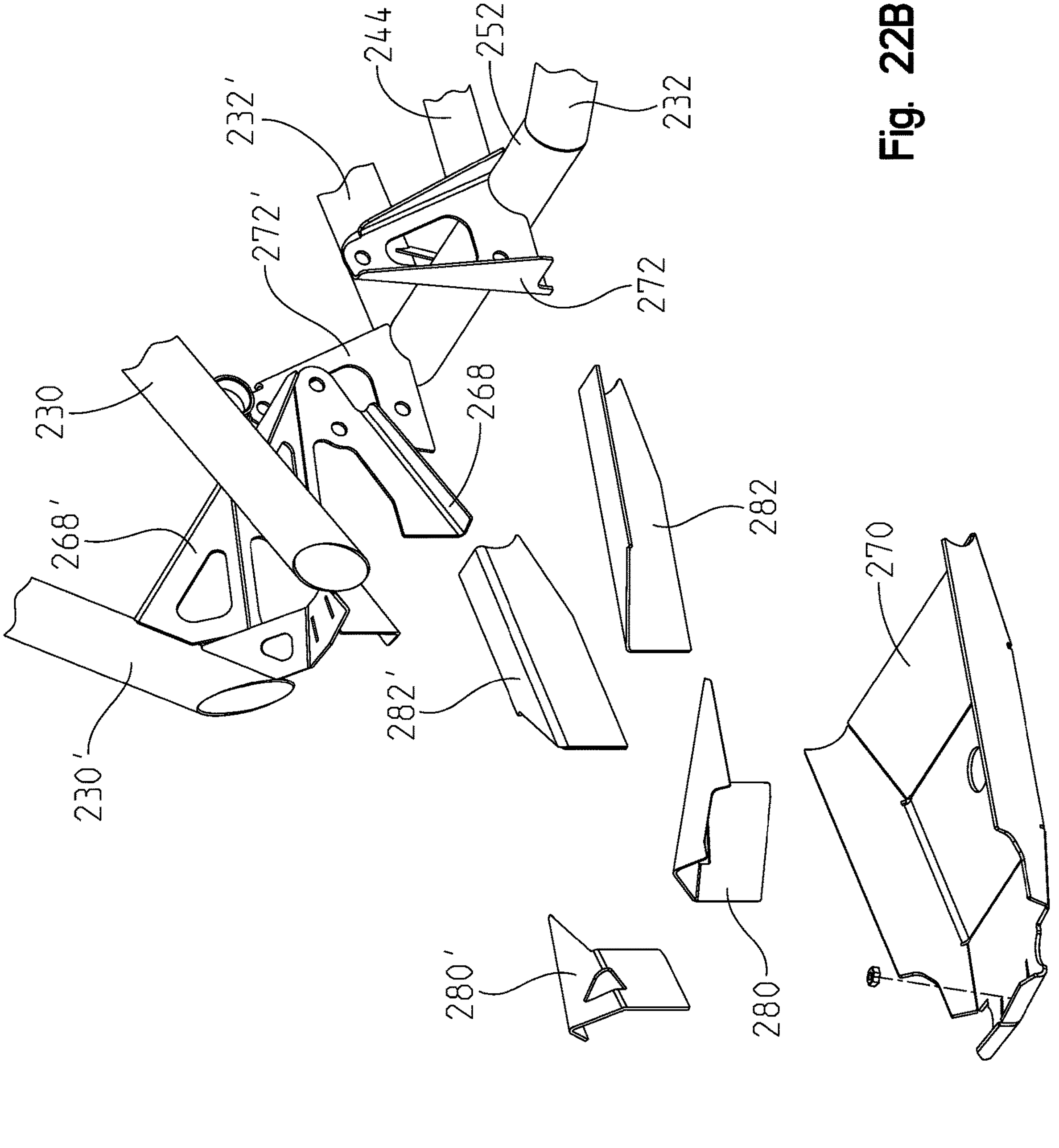
FIG. 22B is a perspective exploded view of a portion of the rear weldment of FIG. 21.
Figure 23:
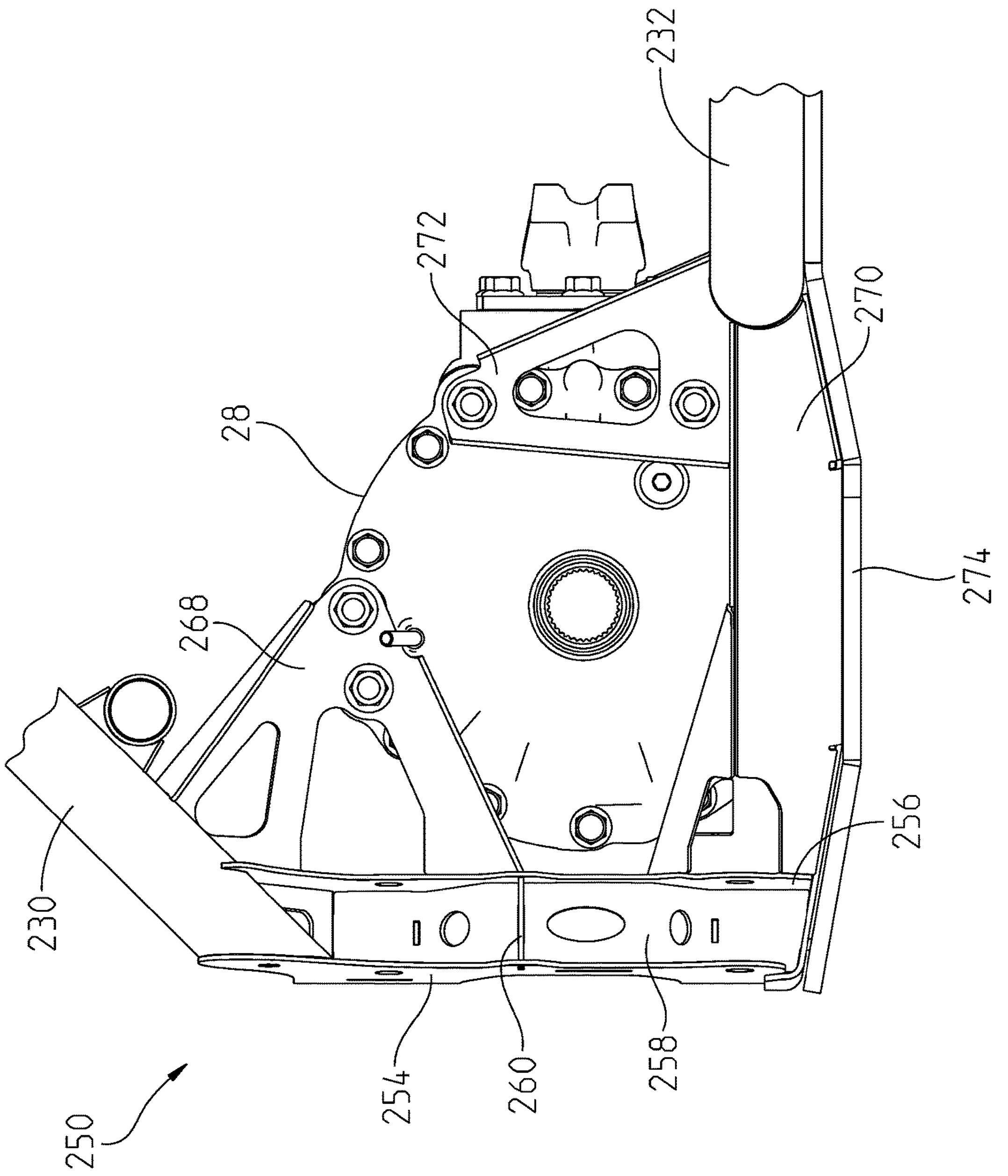
FIG. 23 is a right-side, elevation view of the rear weldment and final drive of FIG. 21, shown with the final drive in an installed position.

Rear weldment 250) is shown in detail in FIGS. 21-23. Weldment 250 includes rear plate 254 and front plate 256 which are oriented upright and perpendicular to the longitudinal axis of vehicle 10 (i.e., left-to-right), and are arranged substantially parallel to one another. A pair of spreader brackets 258 are interposed between the plates 254 and 256 and arranged generally perpendicular to the plates 254 and 256, such that plates 254 and 256 cooperate with spreader brackets 258 to create a box-like structure. Stiffener plates 260 attach to the outer surfaces of spreader brackets 258 and extend to the outer edges of plates 254, 256, as shown in FIG. 21. Additional stiffener plates 262 and 264 extend between the spreader brackets 258. A tube abutment plate 266 has a U shape and attaches to the top of brackets 258, with "wings" extending upwardly and outwardly toward tube attachment points at the upper and outer corners of plates 254, 256.

All of the components of weldment 250 are fixed (e.g., welded) to one another along seams and abutments. As best seen in FIG. 22A, the components of weldment 250 include a series of tabs and slots sized and positioned to interfit with one another upon initial assembly. This allows the components to be fixtured in a precise location and orientation prior to welding, and to remain fixtured during the welding process. This creates a highly stiff and strong box-like structure capable of absorbing and distributing complex dynamic forces which may be experienced as a result of the operation of rear final drive 28 (FIGS. 21 and 23), the actuation of rear shocks 38 and other components of rear suspension 24 during operation of vehicle 10, and direct impacts. Direct impacts may occur from trail hazards, or when the tail of vehicle 10 makes first contact with the ground after a jump, for example.

Upper frame tubes 230, 230' are fixed to the box-like structure at the upper and outer corners (i.e., upper right and upper left corners) thereof, as shown in FIG. 21. The front plate 256 includes tube cradles 257 at the upper corners sized to interfit with the outer surfaces of the respective tubes 230, 230', which creates seams which may be welded. The rear plate 254 receives the abutting axial end surfaces of the tubes 230, 230', and may include apertures for bolting the plate 254 to a threaded fixture contained within each tube 230, 230'. This bolted connection may then also be held while welding along the seam created between tubes 230, 230' and rear plate 254.

The box-like structure defined by plates 254, 256 and their associated brackets 258 and other components also provides attachment points for the components of rear suspension 24 (FIG. 9). In particular, the control arms of rear suspension 24 may be pivotably mounted to each respective corner of the box-like structure via apertures 276. Each control arm is supported on both sides of the pivotable connection, creating a double-shear support. At the lower corners, base plate 270 and rear corner brackets 280 cooperate to provide a tool-access opening 278 which allows a bolt head or nut to be engaged by a wrench for attaching or detaching the control arms.

The box-like structure is integrated into and fixed (e.g., welded) to the forward structures of weldment 250. In particular, forward plate 256 abuts and is welded to base plate 270, rear corner brackets 268, 268' and rear drive mounting brackets 268, 268'. Additionally, spreader brackets 258 and rear plate 254 may also be welded to respective abutting surfaces of base plate 270.

Turning to FIG. 22B, the forward structures of weldment 250 are also welded to one another. Rear corner brackets 280, 280' are welded to base plate 270. Front corner brackets 282, 2812' are welded to base plate 270 and rear corner brackets 280, 280' respectively, creating a strong tubular-type structure along the outer and lower corners of weldment 250. Front drive mounting brackets 272, 272' are welded to cross brace 252 and to front corner brackets 282, 282' respectively, and base plate 270 and front corner brackets 282, 282' are also welded directly to cross brace 252.

Weldment 250 in integrated into the larger chassis 100 via upper frame tubes 230, 230', which are fixed directly to plates 254, 256 as described above, and via lower frame tubes 232, 232', which are fixed (e.g., welded) to right and left forward corners of base plate 270. In the illustration of FIG. 21, frame tubes 232, 232' are welded to base plate 270 via cross brace 252, though it is contemplated that cross brace 252 could be eliminated and frame tubes 232, 232' could be welded directly to base plate 270. Longitudinal brace 244 is also fixed to cross brace 252 and creates a secondary load path to the larger chassis 100. Notably, no frame tubes extend to the lower-rear corner of chassis 100. Instead, the lower-rear corner of chassis 100, which is also the lower-rear corner of weldment 250, is occupied entirely by sheet metal components (namely, base plate 270 and the structures attached thereto) welded to one another as described above. This creates a strong, rigid and resilient structure capable of withstanding substantial impact forces while protecting the rear final drive 28 cradled within the weldment 250.

As shown in FIG. 23, rear final drive 28 may be bolted to drive mounting brackets 268, 268', 272, 272', and may be maintained in a position spaced from base plate 270 and spaced from the front plate 256 of the box-like structure. This avoids direct contact between the rear final drive 28 and the structures most directly affected by impacts to the lower-rear corner of weldment 250, creating further impact resistance and protection for the final drive 28. A further cover plate 274, shown in FIG. 23, may undergird the entire rear weldment 250 and extend forwardly under other portions of chassis 100.

Advantageously, rear weldment 250 provides a continuous load path between upper frame tubes 230, 230' and lower frame tubes 232, 232'. In particular, the front and rear plates 256, 254, together with the base plate 270 span all four mounting points for the respective tubes 230, 230', 232 and 232'. This creates a weldment 250 which efficiently and effectively distributes loads to the rest of rear section 108 of chassis 100.

Weldment 250 is open along a forward-and-upward path, allowing rear final drive 28 to be removed and serviced. In particular, drive 28 can be unbolted from brackets 268, 268', 272, 272' and withdrawn upwardly between upper frame tubes 230, 230', avoiding the need to remove a bolted section of the chassis 100 as is known in other designs. This allows chassis 100 to be a continuous weldment at the rear section 108, contributing to strength and stiffness and discussed herein.

Chassis 100 has right section 104 and left section 106 which link the front section 102 to the rear section 108, and bound the left and right sides of the cab. Each section 104 and 106 includes A-pillar 160, B-pillar 162, and pillar bridge tube 161 linking the top ends of pillars 160 and 162. Pillars 160 and 162 and pillar bridge 161 may all be formed from a single monolithic pieces of steel tubing, as shown. Cross braces 168 are arranged in an X-shape and each extend from A-pillar 160 to B-pillar 162, as shown in FIG. 17. In particular, one of the pair of cross braces 168 extends from a lower end of the A-pillar 160 to a mid-portion of the B-pillar 162. The other cross brace 168 extends from a lower end of the B-pillar 162 to a mid-portion of the A-pillar 160. A pair of cross brace joiners 169 are provided at the center point of the "X" formed by cross braces 168 and fixed (e.g., welded) thereto for strength and rigidity. An additional, generally upright cross brace 158 extends from the bottom to the top of each A-pillar 160 and forms a second X-shape with one of the cross braces 168, as also shown in FIG. 17. Cross braces 158 and 168 are fixed (e.g., welded) to an additional pair cross brace joiners 159.

Right and left sections 104, 106 of chassis 100 are joined across their top potions to form a robust rollover protection system, or ROPS. A forward ROPS cross member 166 is fixed (e.g., welded) to the left and right pillar bridge tubes 161 just rear of the top of A-pillars 160. Upper cross brace 120 is fixed (e.g., welded) to the top portion of each of the B-pillars 162. Corner ROPS braces 164 extend from a center portion of upper cross brace 120 to a center portion of pillar bridge tube 161, and are fixed (e.g., welded) to each of these abutting tubes.

The lower ends of A-pillar 160 and B-pillar 162 are fixed (e.g., welded) to outer base tube 116, which extends along a straight path from A-pillar 160 to B-pillar 162. Base tube 116 gives way to outer base joiner tube 117 at its front end, and base joiner tube 117 slopes downwardly and inwardly toward its connection with front weldment 150 as described above. Additionally, inner base tube 114 extends from the lower end of B-pillar 162 to a junction with front weldment 150, and is positioned inwardly and downwardly relative to outer base tube 116. The left and right inner base tubes 114 converge from a wide rear spacing at the lower ends of B-pillars 162 (FIG. 20) to a narrow forward spacing at their respective junctions with front weldment 150 (FIG. 17).

Together, these arrangements of tubes 114, 116, 117 create a profile that tapers inwardly towards the bottom of chassis 100 as viewed from the front or rear (FIG. 20). This inward taper increases clearance along the lower, outer sides of vehicle 10 as best seen in FIGS. 1-4. This allows vehicle 10 to clear boulders or other obstacles more effectively as such obstacles pass from the front ground engaging members 12 toward the rear ground engaging members 12, for example. At the same time, this inward taper at the bottom of chassis 100 does not compromise the interior shoulder and hip room adjacent the upper and lower portions of seats 14, 16 respectively.

The shoulder room afforded by chassis 100 is further enhanced by an outward flare of the lower portions of the B-pillars 162. As shown in FIG. 20, the lateral spacing between the left and right B-pillars 162 expands from their lower ends, where B-pillars 162 form respective junctions with inner base tubes 114 (FIG. 18), to a mid portion, where B-pillars are joined by cross brace support 126. This vertical position of the widest portion of the cab of vehicle 10 corresponds to the shoulder height of a typical driver or passenger seated in seats 14 or 16. The lateral spacing then narrows as B-pillars extend upwardly from their junctions with support 126 to their upper ends (i.e., their junctions with pillar bridge tubes 161 as shown in FIG. 19).

Right and left protection plates 128, 128' may be attached (e.g., bolted) to the tapered portions of chassis 100, as variously shown in FIGS. 1-4 and 8-9. Plates 128, 128' protect the underlying tubes 114, 116 from impact and damage, while following the inward and forward taper established by the tubes 114, 116.

Turning now to FIG. 9, chassis 100 includes integrated jack points to facilitate raising vehicle 10 for inspection, repair or service. In particular, a lateral or transverse tube 186 is positioned in a correspondingly sized transverse aperture formed through outer base tube 116 at a position just rear (e.g., within 12 inches) of its junction with A-pillar 160, on both the left and right sides of the chassis 100 (see also FIG. 17).

The jack points provided by tubes 186 are specifically designed at a point in the existing, non-augmented tube 116 where the stress of jacking is acceptable, body panels are not in spatial conflict, and the desired effect (i.e., lifting a front portion of vehicle 10) can be achieved. "Non-augmented" in this context, means no additional material has been added to tube 116 except for the jack point tube 186 itself. That is, the cross-section of tube 116 is consistent in the vicinity of the jack point tube, and may be consistent along its entire length, including in the vicinity of the installation location of the jack point tube 186.

At the rear of chassis 100, additional jack point tubes 188 (FIGS. 9 and 12) may be provided as part of rear bumper assembly 112. Bumper 112 may be bolted to the corners of the rear weldment 250 for rigid and firm fixation to the chassis. Two tubes 188 are fixed (e.g., welded) to a tubular member of the bumper 112 in a generally horizontal and longitudinal (i.e., front-to-back) orientation. The pair of tubes 188 may be symmetrically arranged, i.e., they may be mirror images of one another about a vertical longitudinal plane bisecting vehicle 10 (and chassis 100) from front to back.

Figure 13:
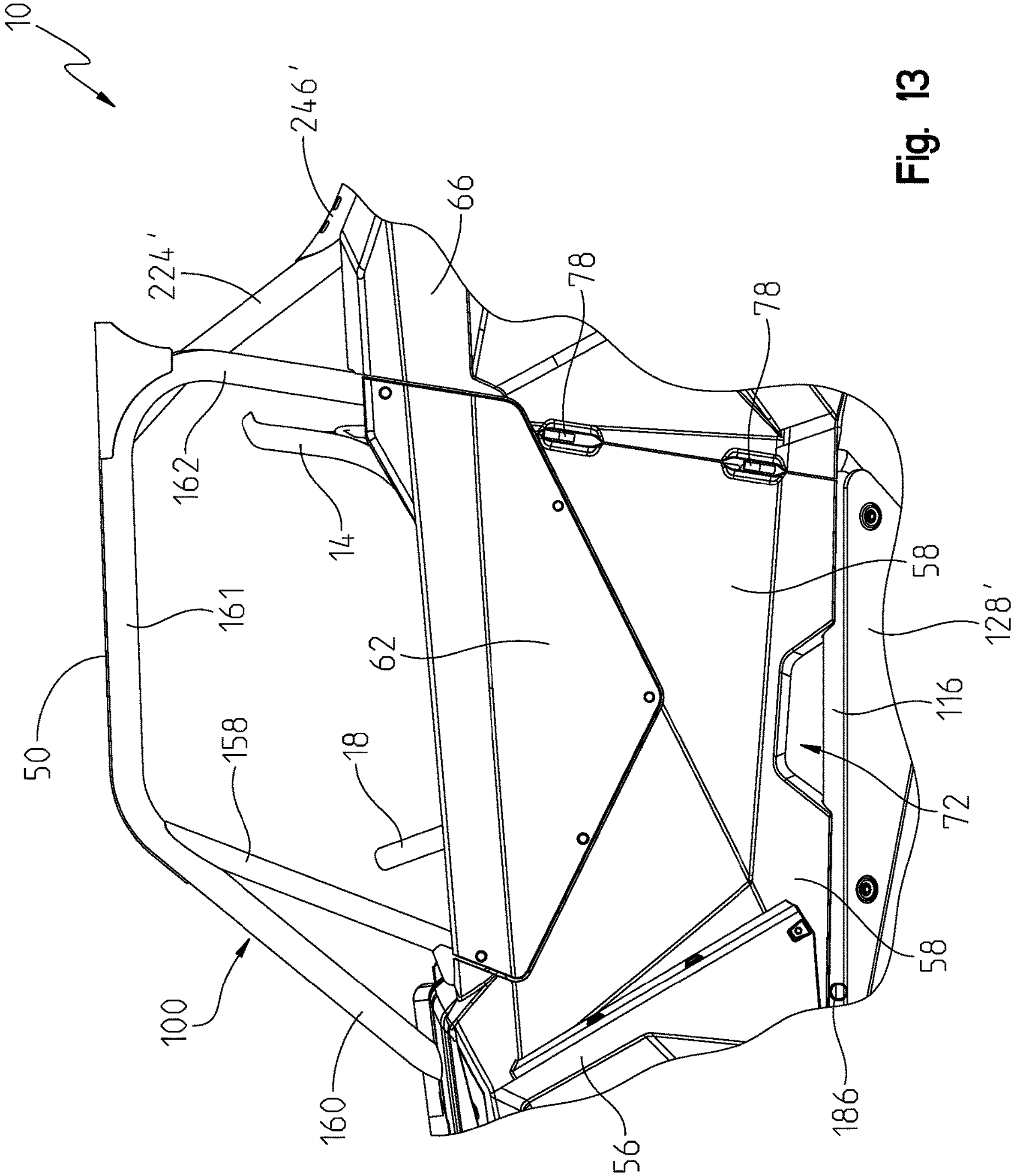
FIG. 13 is an enlarged view of a portion of the vehicle shown in FIG. 12.

All of tubes 186, 188 are sized to receive a male component of a jack or stand. For example, as shown in FIG. 9, side stand 190 may be engaged with tube 186 to hold a side of vehicle 10 up (e.g., after raising the vehicle 10 using a floor jack or the like, as may be found in a shop setting). Alternatively, jack 194 may be engaged with tube 186 to lift a side of the vehicle 10, such as may be required for field repairs. Jack 194 may be carried as cargo with vehicle 10. As shown in FIG. 13, for example, tubes 186 are unobstructed by any adjacent body panels or other structures, including driver door 58 (and passenger door 68 on the right side of vehicle 10), and protection plates 128, 128'. This allows jack points tubes 186 to be quickly accessed in the field without any removal of other components. Jack point tubes 188 are similarly unobstructed.

At the rear of vehicle 10, either jack 194 may be used to lift vehicle 10 or rear stand 192 may be used to hold the rear of vehicle up. Rear stand includes two male components designed to be engaged with both of the tubes 188 installed to rear bumper 112, such that a single stand is capable of securely holding the entire rear of vehicle 10. Jack 194, which has a single male component, may be used to lift one side of the rear of vehicle for service or repair (e.g., wheels, tires or suspension components).

Tubes 186, 188 may be used to hold the entire vehicle 10 suspended, such as for longer service intervals. In this case, two side stands 190 and a single rear stand 192 may be used. Alternatively, a single corner of vehicle may be elevated for quick service, such as changing a flat tire, attending to suspension service needs, and the like.

Turning back to FIGS. 1-7, various bodywork panels are attached to the exterior of chassis 100 to protect against dust, moisture and other contamination, and also provide vehicle 10 with a distinctive appearance. These include roof 50 connected to the outer surface of the ROPS above the driver and passenger seats 14, 16, hood 52 covering the top of front section 102 of chassis 100 and the components contained therein, front right quarter panel 54 covering at least a portion of the right side of front section 102, front left quarter panel 56 covering at least a portion of the left side of front section 102, driver door 58 covering the left section 106, passenger door 68 covering the right section 104, rear right quarter panel 64 covering part of the right side of rear section 108, and rear left quarter panel 66 covering part of the left side of rear section 108. Generally speaking, each of the foregoing body panels are designed to be permanently mounted to vehicle 10 but can be removed for service.

Figure 14:
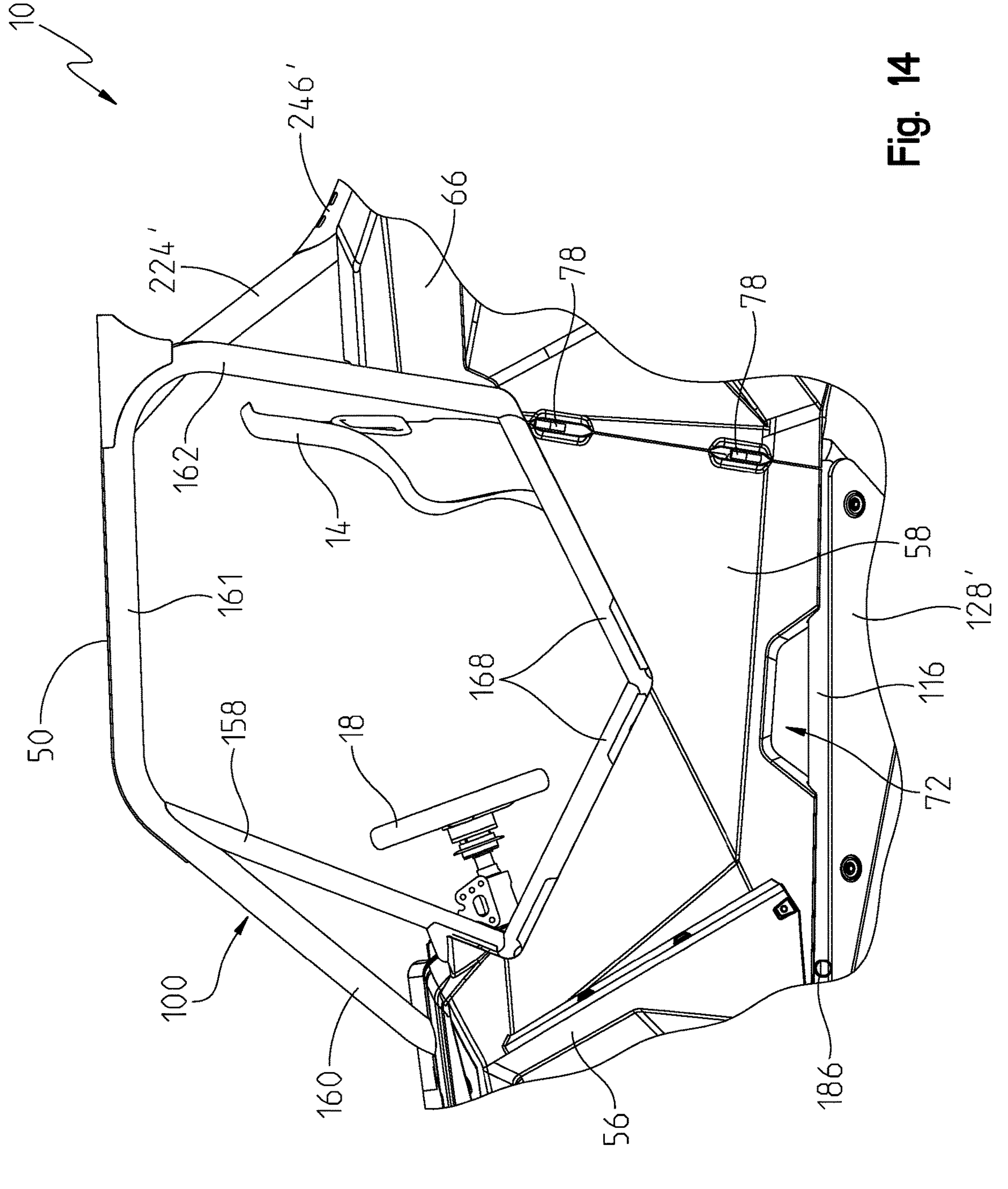
FIG. 14 is another enlarged view of the portion of the vehicle shown in FIG. 13, shown with a door panel removed.

Additionally and with reference to FIG. 13, a right removable door panel 60 is designed to selectively fill in an upper V-shaped void left by driver door 58, and a corresponding left removable door panel 62 selectively fills a similar void left by passenger door 68. The V-shaped voids of the driver door 58 and passenger door 68 overlap the opening in the left and right sections 106, 104 of chassis 100 such that removing door panels 60, 62 provides full access to the opening for ingress and egress. With reference to FIG. 14, the V-shaped void of door 58 follows the correspondingly V-shaped contour of the upper portions of cross braces 168, above the cross brace joiners 169. Door 68 has the same relationship with the right-side braces 168. Door panel 60 can be selectively attached to the driver door and/or the left section 106 of chassis 100 by hand and without the use of tools, such as by resiliently deformable grommets, latches, and the like. Door panel 62 can be selectively attached to right section 104 in the same manner.

Removable panels 60 and 62 can also be installed to protect the driver and passenger from dust and passing hazards (e.g., in high-speed terrain). As shown in FIG. 13, removable panels 60, 62 have a height extending less than halfway up the total height of the ingress/egress openings in chassis 100, i.e., from the bottom of the "V-shape" defined by the upper portions of cross braces 168 to the top of the opening in chassis 100, as defined by pillar bridge tube 161 (FIG. 14). For example, the top of removable panels 60, 62 intersects steering wheel 18 as viewed from the right or left side of vehicle 10.

Figure 15:
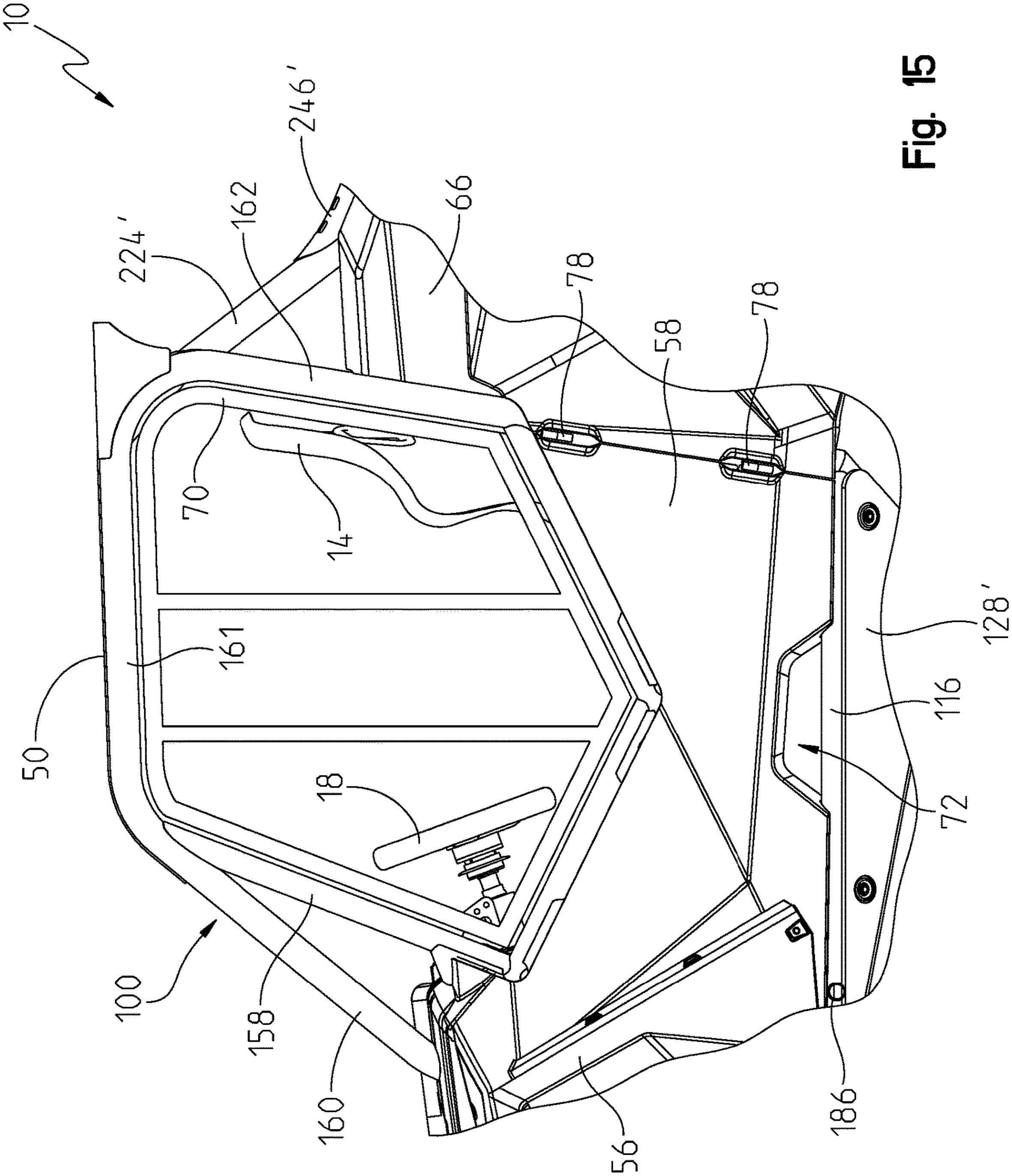
FIG. 15 is another enlarged view of the portion of the vehicle shown in FIG. 14, shown with a screen door panel emplaced.

Alternatively, with reference to FIG. 14, panels 60 and 62 can be left off to provide clear lines of sight to the sides of vehicle 10 (e.g., in low-speed, technical terrain). The configuration of FIG. 14 also eases ingress through the vehicle, as the full opening above cross braces 168 is available. In yet another alternative shown in FIG. 15, screen door panel 70 may occupy the full opening above cross braces 168 to provide additional protection in hazardous terrain, such as trails with cacti and the like. Screen door panel may be installed and removed by a user without the use of tools in a similar manner as door panels 60, 62.

Driver door 58 and passenger door 68 each include a foothold cutout 72 along the bottom edge thereof. The left-side foothold cutout 72 is shown in FIGS. 12-15, it being understood that the right-side foothold cutout 72 is a mirror image. Cutout 72 is positioned above and adjacent to an upper surface of a tube of chassis 100, namely, outer base tube 116. In this way, cutout 72 is defined at its lower edge by an upper surface of outer base tube 116 of chassis 100. This lower edge/upper surface provides a step for a driver or passenger which facilitates ingress and egress through the opening in chassis 100 above door 58 (and panel 62, if installed). Cutouts 72 may be at a height H above an adjacent support surface of about 20 inches. Because cutouts 72 provide access to the adjacent surface of an existing tube 116, cutouts remove weight while providing a step, as opposed to adding weight by providing a dedicated platform step.

Figure 2:
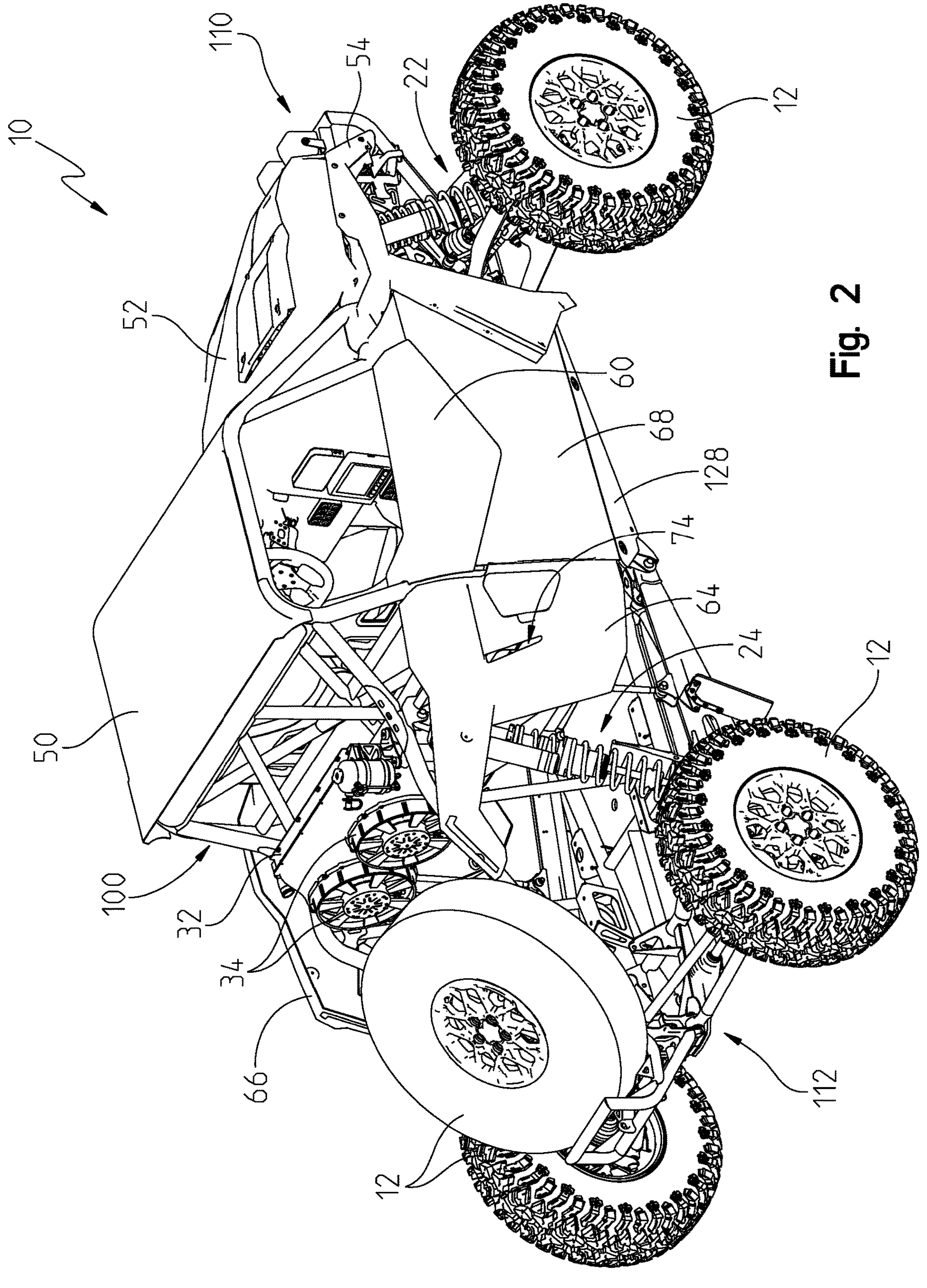
FIG. 2 is a rear, right-side perspective view of the vehicle shown in FIG. 1.
Figure 4:
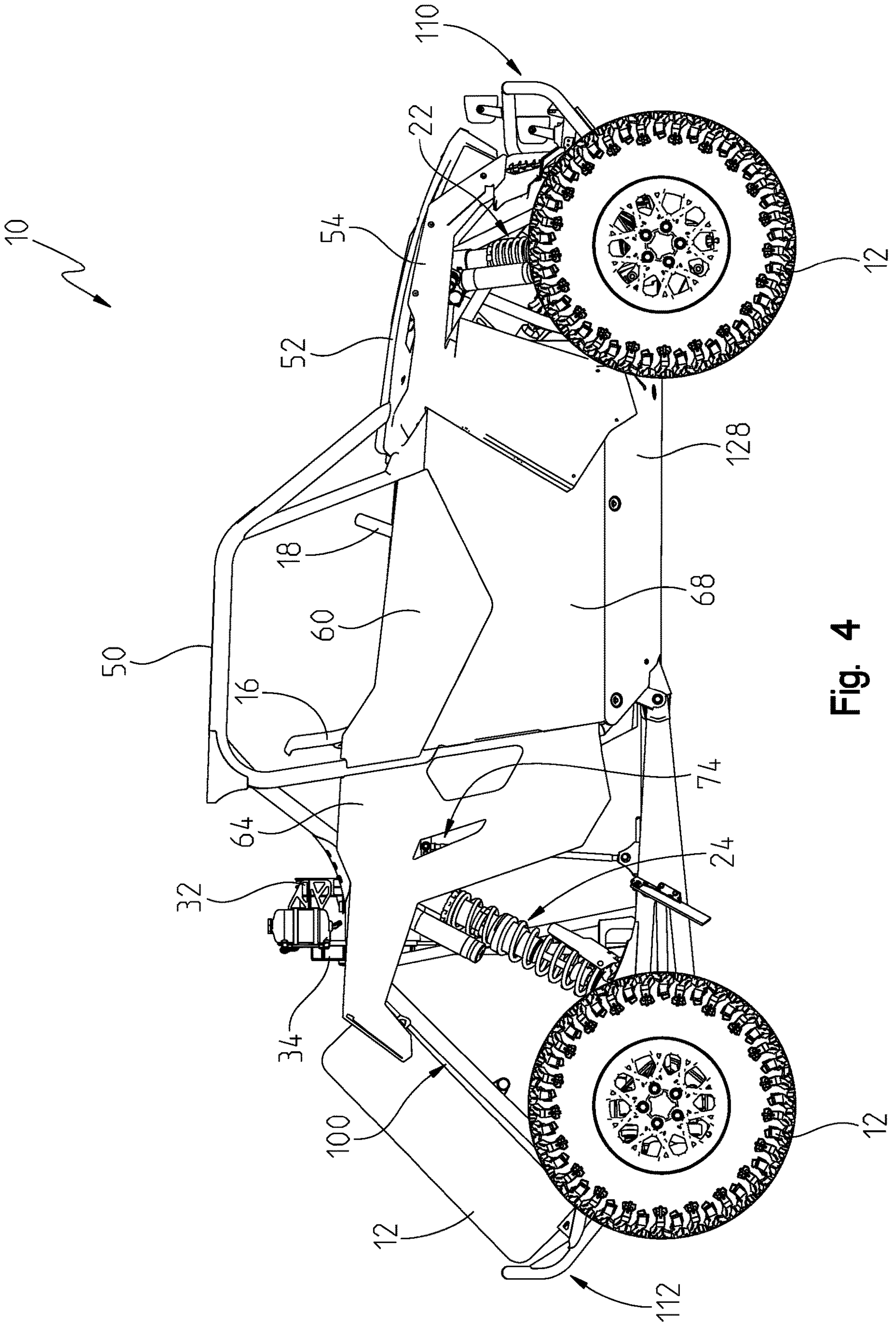
FIG. 4 is a right-side elevation view of the vehicle shown in FIG. 1.
Figure 5:
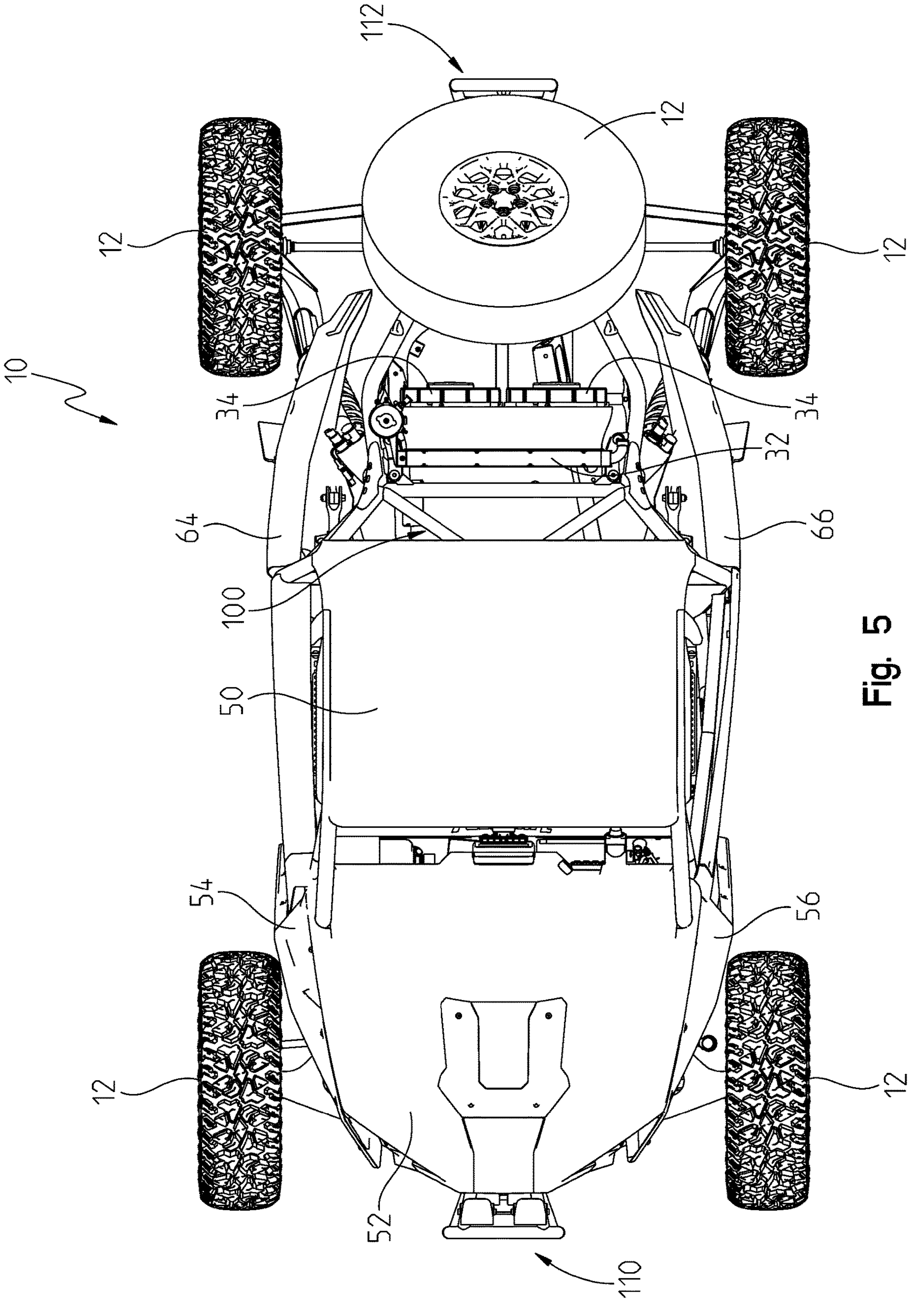
FIG. 5 is a top plan view of the vehicle shown in FIG. 1.
Figure 12:
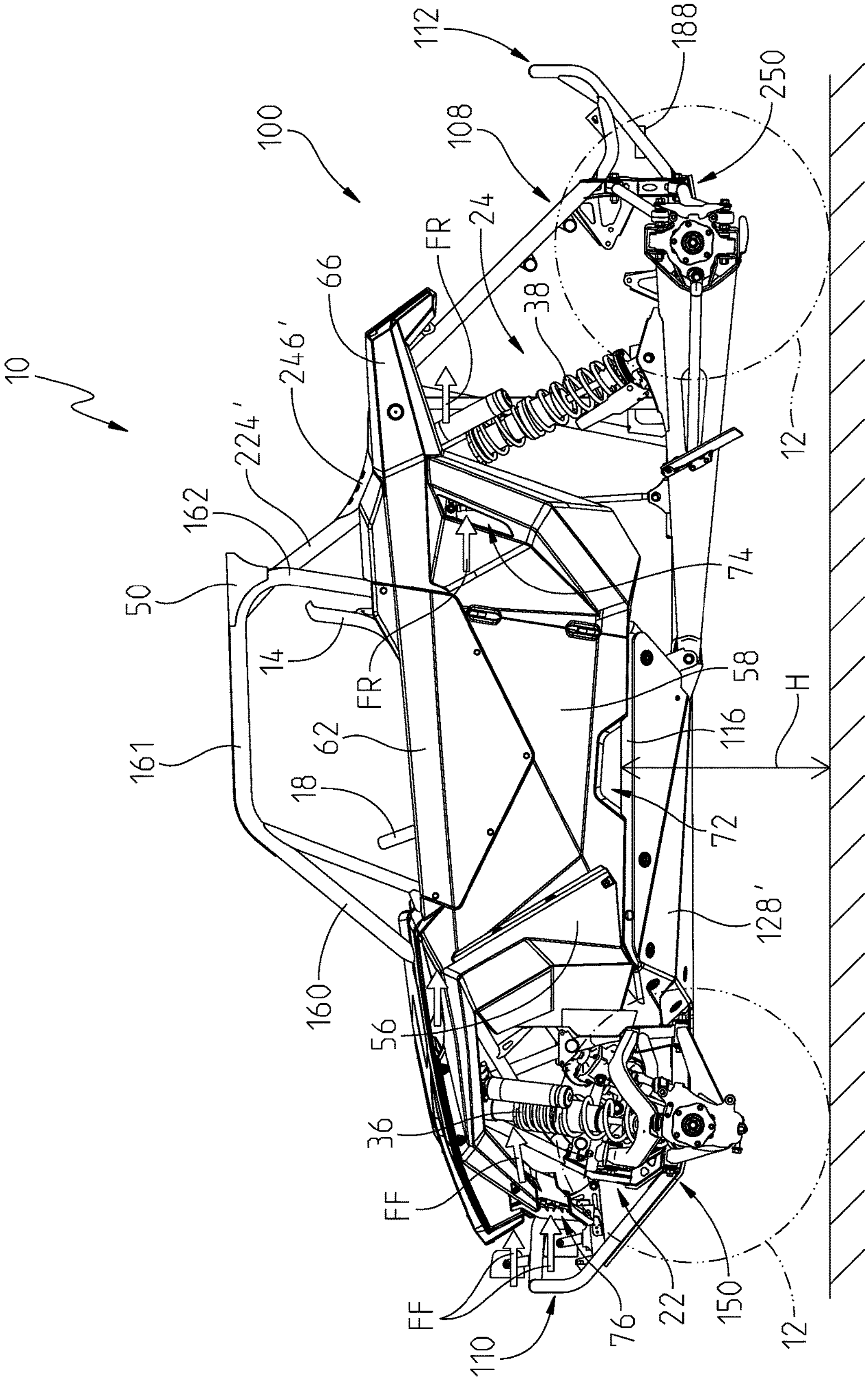
FIG. 12 is a left-side elevation view of the vehicle of FIG. 1.

A series of vents or openings may be provided in bodywork panels to provide cooling airflow to the front and rear shocks 36, 38. A rear vent 74' is provided in left rear quarter panel 66, as shown in FIGS. 1 and 3. An identical but mirror image rear vent 74 is provided in right rear quarter panel 64, as shown in FIGS. 2 and 4. Each rear vent 74, 74' is positioned forwardly of one of the rear shocks 38. As vehicle 10 moves forward, air flows along path FR (FIG. 12)

through vents 74, 74' and over rear shocks 38. In particular, the air flows over the top portion of rear shocks 38, which include the fluid reservoir and the damper of the shocks 38, rather than over the lower portion which is occupied only by the coil spring and damper rod. The air flows over these structures to cool the shocks 38 during periods of heavy actuation, such as may occur on rough terrain. As the airflow FR continues toward the back of vehicle 10, other components adjacent shocks 38 may also receive a cooling airflow, including engine 20, transmission 30, and radiator 32 (FIG. 11).

Front vents 76 are also provided under hood 52 and forward of quarter panels 54, 56. A left-side front vent 76 is shown in FIGS. 1 and 12, it being understood that a right-side front vent is an identical mirror image of the left-side vent 76 taken about a vertical longitudinal plane bisecting vehicle 10 from front to back. Each front vent 76 is positioned forwardly of one of the front shocks 36. Similar to vents 74, 74', air flows through vents 76 during forward vehicle movement to direct a flow FF of cooling air over front shocks 36, and particularly, over the top portion of shocks 36 which includes the fluid reservoir and the damper of the shocks 36, rather than over the lower portion which is occupied only by the coil spring and damper rod. As with shocks 38, this airflow FF cools shocks 36 during periods of heavy actuation.

Providing vents 74, 74' and 76 obviates the need for dedicated shock coolers to keep shocks 36, 38 within acceptable operating temperatures and prevent oil breakdown or thermal degradation of wiper seals. The absence of dedicated shock coolers reduces cost and weight of the vehicle 10. Vents 74, 74' and 76 may also contribute to airflow over the engine 20 and transmission 30 (FIG. 12), such that a single radiator 32 may be used for both engine 20 and transmission 30, as described further below.

Rear quarter panels 64, 66 are rotatably connected to chassis 100 and may be easily opened or removed to facilitate access to components contained and supported by rear section 108. FIGS. 13-16 illustrate hinges 78 which pivotably connect driver door 58 to rear left quarter panel 66. Hinges 78 may also be provided on the right side of vehicle 10 in the same manner, except between passenger door 68 and rear right quarter panel 64.

Figure 16:
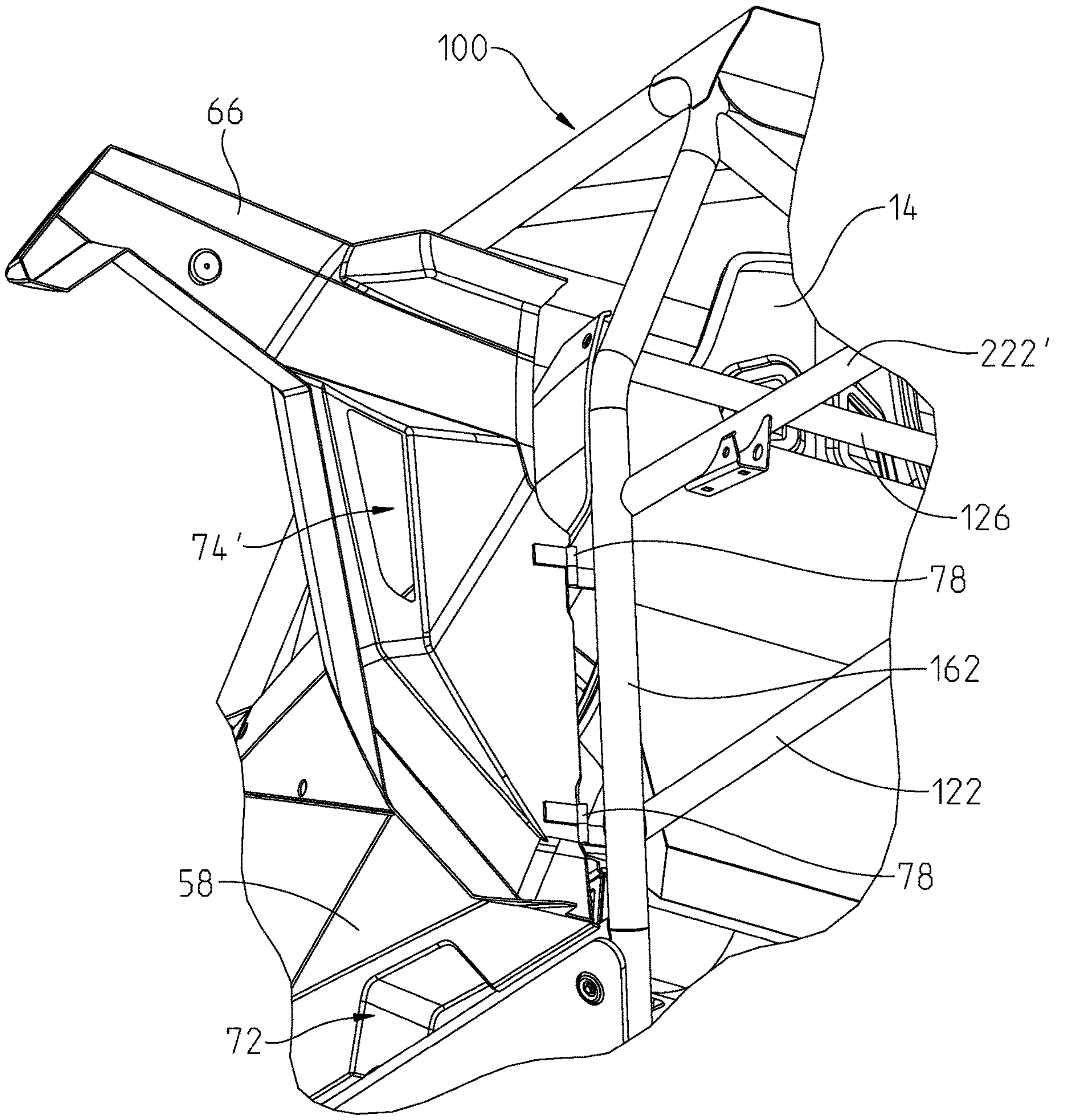
FIG. 16 is a perspective view of a right-side perspective view of a portion of the vehicle of FIG. 1, shown with a rear right quarter panel pivoted to an open position.

Driver door 58 is fixed (e.g., bolted) to chassis 100 and non-pivotable, but quarter panel 66 can be selectively disengaged from rear section 108, such as by an elastically deformable grommet sized to receive a flared pin, for example. Quarter panel 66 defines a closed position in which it covers at least a portion of the left side of rear section 108 is covered. Quarter panel 66 can be pivoted away from rear section 108 to an open position by hand and without the use of tools. FIG. 16 shows quarter panel 66 in the open position, pivoted about hinges 78 about 90 degrees away from its seated and closed configuration, leaving the rear left side of the rear section 108 of chassis exposed.

Figure 6:
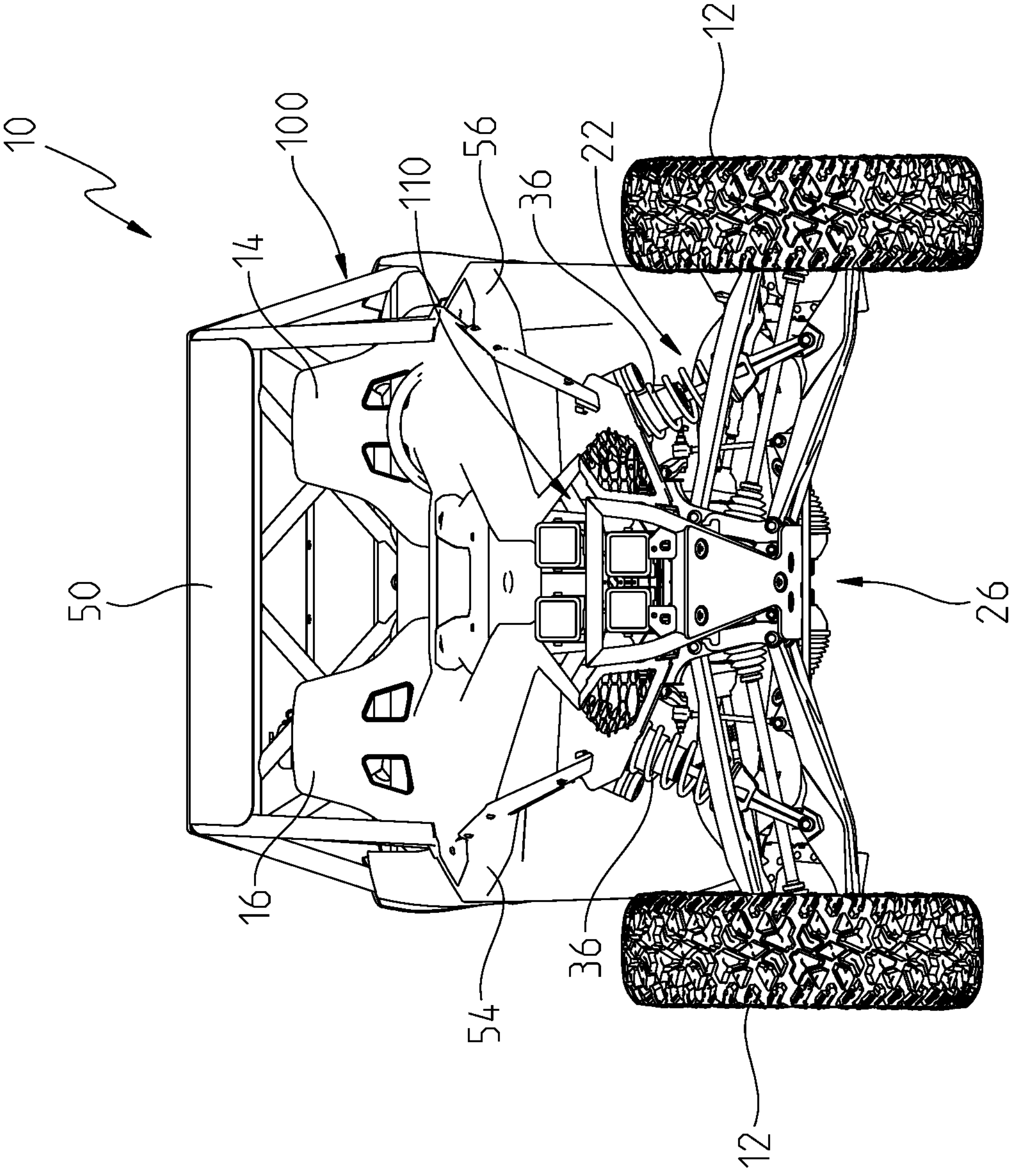
FIG. 6 is a front elevation view of the vehicle shown in FIG. 1.
Figure 7:
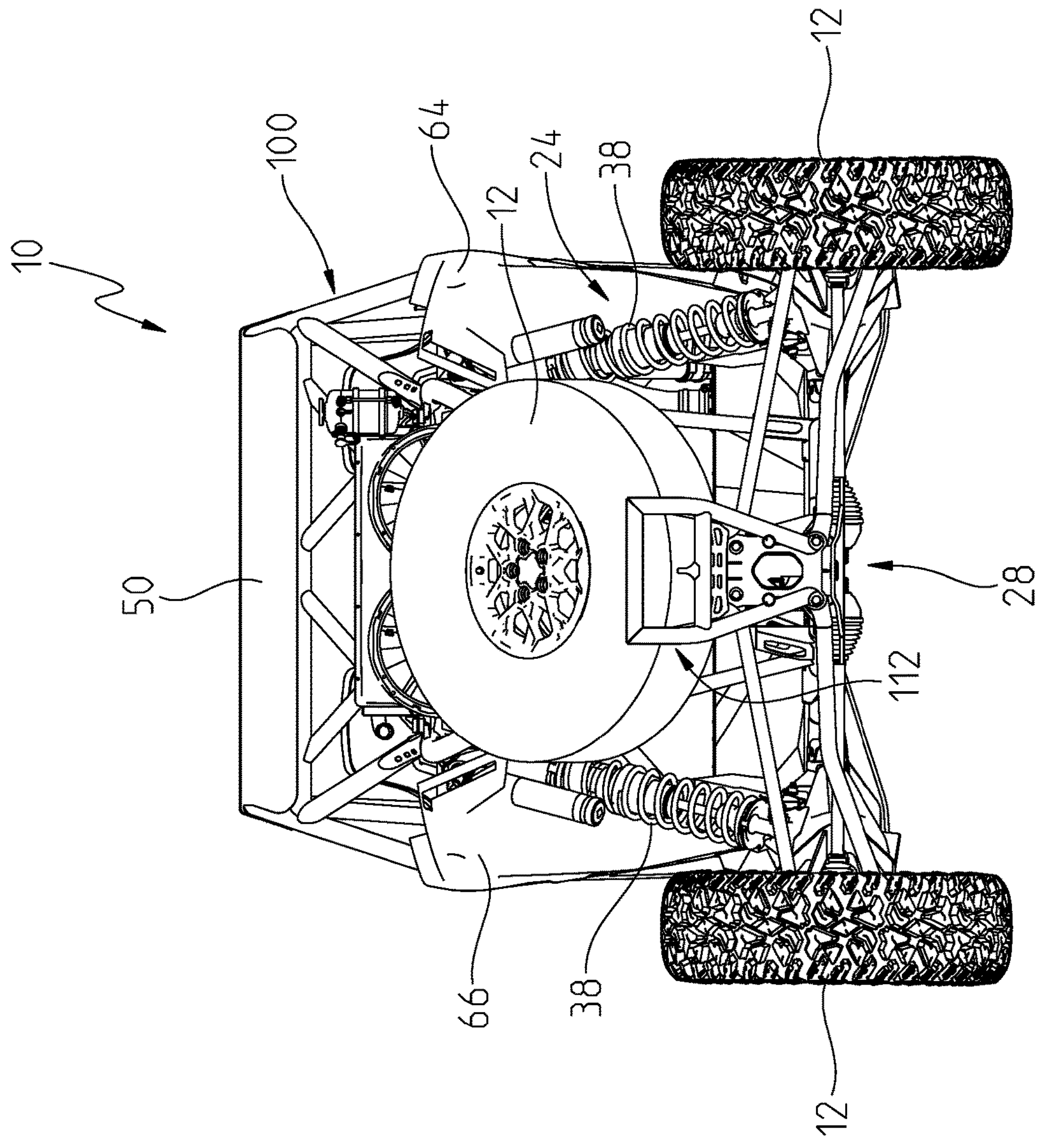
FIG. 7 is a rear elevation view of the vehicle shown in FIG. 1.

As shown in FIG. 6, hinges 78 may be configured and arranged to allow the entire quarter panel 66 to be lifted off of the male portion of hinges 78 fixed to door 58. For example, hinges 78 may each define a first hinge half fixed to driver door 58 and a second hinge half fixed to the rear left quarter panel 66. The first hinge half may be disengageable from the second hinge half by hand and without the use of tools. In this way, quarter panel 66 can be removed entirely from vehicle 10 by hand and without the use of tools. Quarter panel 66 can be pivoted out of the way around hinges 78 to grant a user access to the components and systems within rear section 108, including transmission 30 and engine 20. If quarter panel 66 still poses any barrier to access, it can simply be removed entirely. As noted above, right quarter panel 64 may be pivoted and/or removed in the same fashion to grant access to the right sides of the components and systems contained in rear section 108. Opening or removing quarter panels 64 and/or 66 may facilitate certain repair or maintenance tasks, such as maintenance of engine 20 and transmission 30, belt replacements, and the like.

Vehicle 10 also excludes a dedicated cooler for transmission 30 (shown schematically in FIG. 11), which may be CVT transmission contained within the rear section 108 of chassis 10 together with engine 20. As noted above, bodywork vents such as vents 74 and 76 may channel cooling air toward rear section 108 which helps to cool the transmission 30 (and engine 20). Additionally, with reference to FIGS. 1-5, vehicle 10 includes a radiator 32 and fans 34 which serve to cool both engine 20 and transmission 30. Radiator 32 is positioned in the rear of vehicle 10 and supported by rear section 108 of chassis 100 behind the cab and seats 14, 16. Radiator 32 sits upright and vertical, as shown, and directs air rearwardly and away from engine 20 and transmission 30, which are positioned further down within rear section 108. Radiator 32 includes a rectangular frame 92 containing and supporting a series of cooling fins 94 which present a maximized surface area to the ambient environment around radiator 32 to facilitate heat discharge from the fluid flowing therethrough, as further discussed below.

At least one fan, illustratively a pair of fans 34 positioned side-by-side (FIG. 2), are positioned adjacent the rear surface of radiator 32 and can be selectively actuated to draw heat rearwardly away from radiator 32, such as when vehicle speeds are too low to provide adequate natural airflow through the fins of radiator 32. Fans 34 may be operably coupled to a controller with receives a signal indicative of coolant temperature. The controller may activate fans 34 when the coolant temperature exceeds a predetermined threshold.

Figure 10:
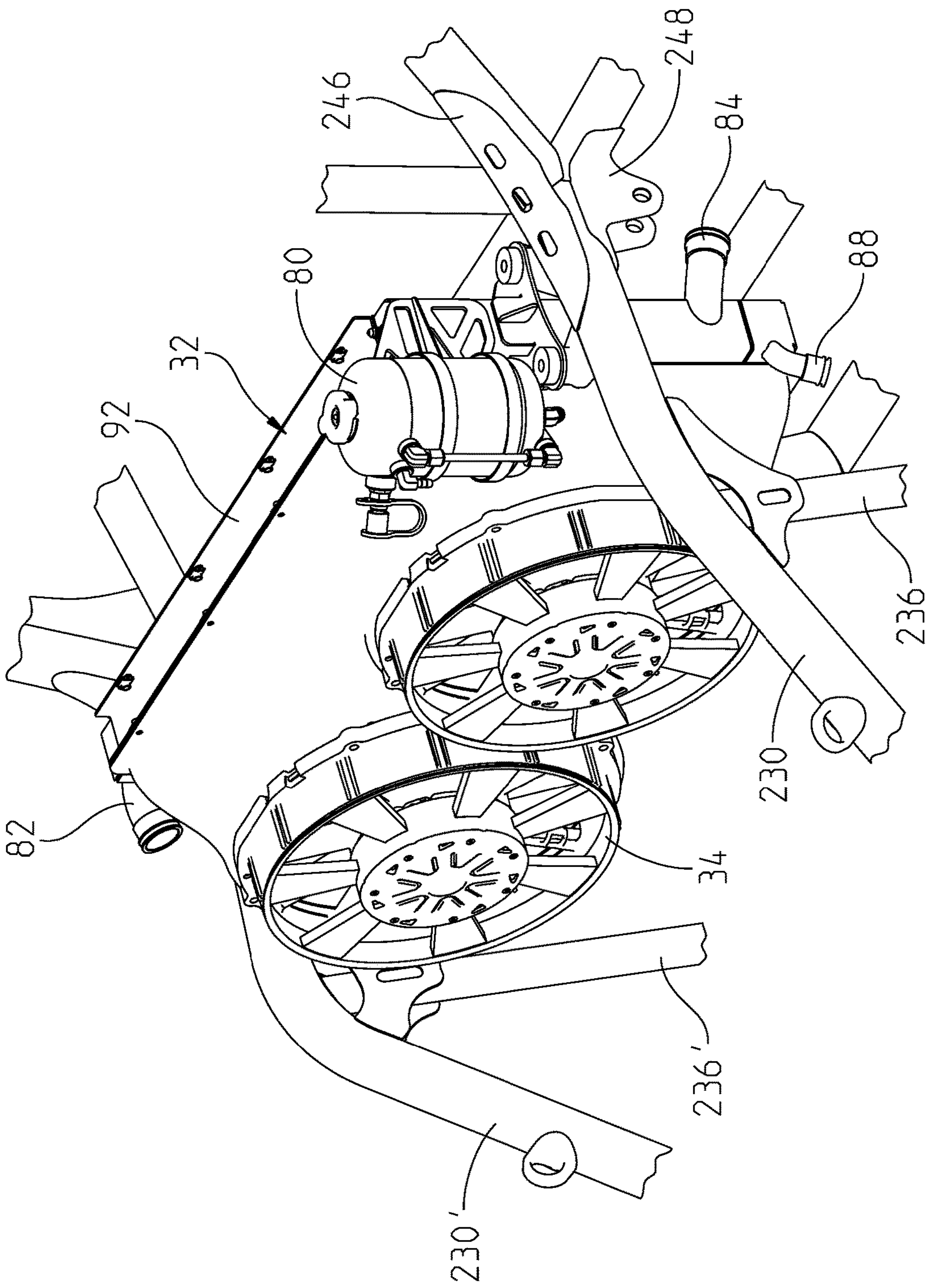
FIG. 10 is a rear, right-side perspective view of a portion of the vehicle of FIG. 1, including a radiator and fans.

FIGS. 10 and 11 illustrate radiator 32 and fans 34 in further detail. A coolant fluid reservoir 80 is positioned at the top of radiator 32 and contains coolant fluid in fluid communication with the engine cooling circuit through radiator. Mounts 90 are provided on the left and right sides of radiator 32 for mounting to chassis 100, and may include rubber grommets for vibration control.

For cooling of engine 20 (FIG. 10), an engine cooling circuit circulates heated cooling fluid to radiator 32 via inlet 82, discharges cooled cooling fluid to outlet 84, and returns the cooled fluid to engine 20 where it is allowed to absorb more heat. This heated fluid is then delivered to the inlet 82 for a new cycle. As fluid flows from inlet 82 to outlet 84, it follows a first cooling fluid path defining a circuitous path through an upper portion of the fins 94 of radiator 32.

For cooling of transmission 30 (FIG. 10), a transmission cooling circuit circulates heated cooling fluid to radiator 32 via inlet 86, discharges cooled cooling fluid to outlet 88, and returns the cooled fluid to transmission 30 where it is allowed to absorb more heat. This heated fluid is then delivered to the inlet 86 for a new cycle. As fluid flows from inlet 86 to outlet 88, it follows a second cooling fluid path defining a circuitous path through a lower portion of the fins 94 of radiator 32.

The engine cooling circuit is fluidly isolated from the transmission cooling circuit, such that the engine coolant and transmission coolant do not intermix. However, both coolants are cooled by contact with the fins of radiator 32 and by the airflow across radiator 32, whether from fans 34, movement of vehicle 10, or both. This allows for cooling of both engine 20 and transmission 30 with a single radiator 32 and a common system of fans 34, offering reduced weight, cost and complexity as compared to vehicles with separate engine and transmission radiators.

Figure 33:
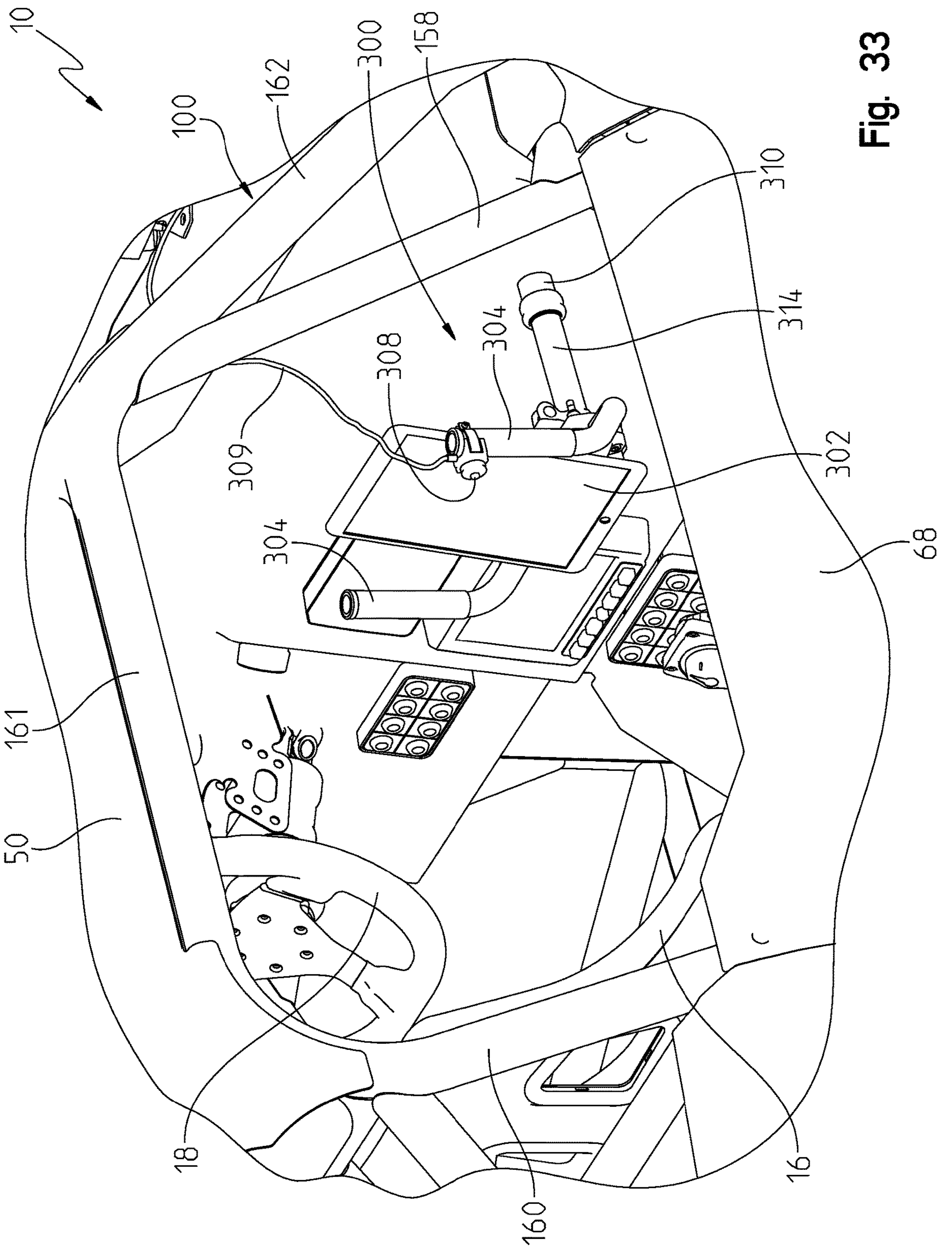
FIG. 33 is a left-side, perspective view of a passenger control station installed to the vehicle of FIG. 1.
Figure 34:
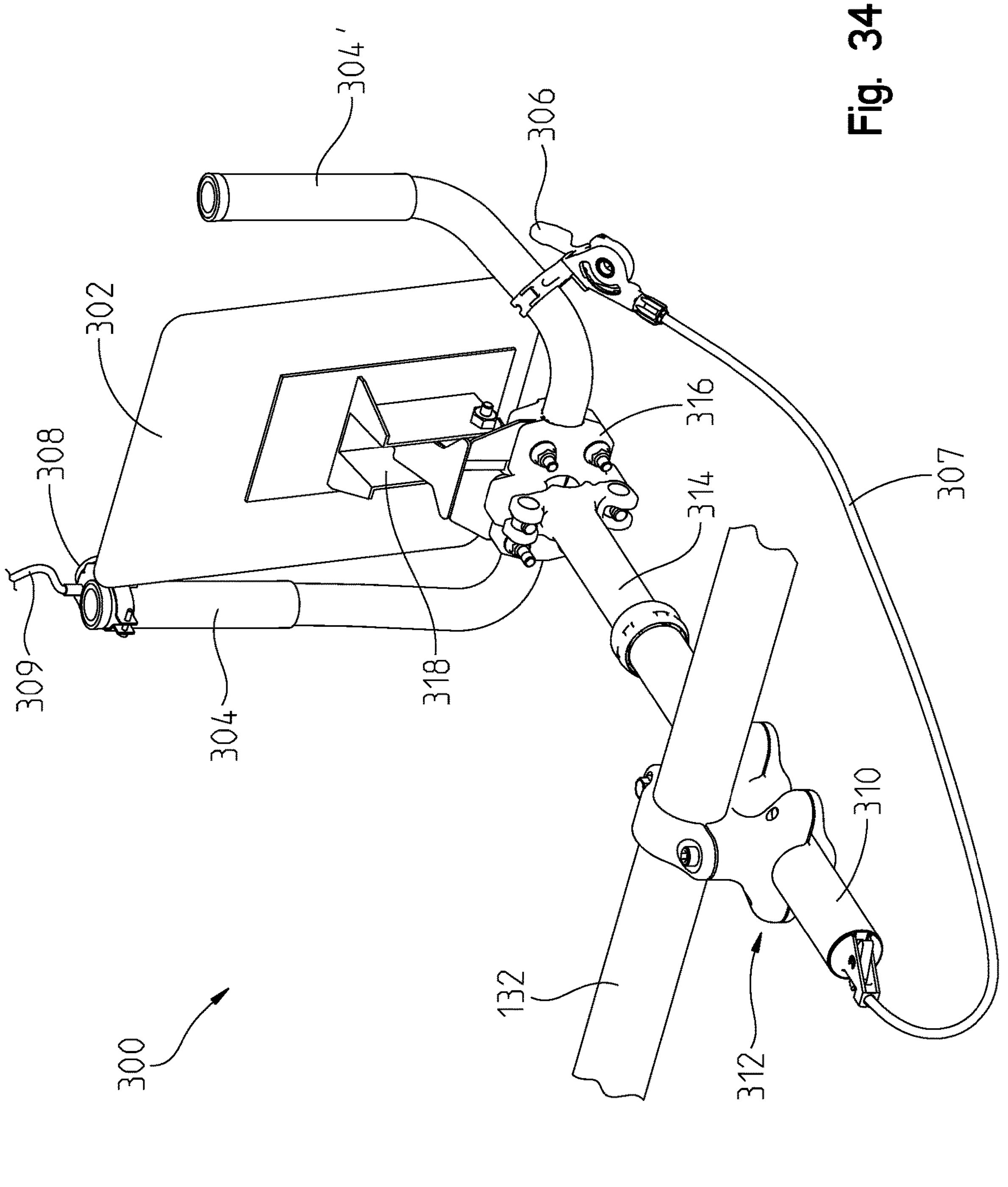
FIG. 34 is a rear, right-side perspective view of the passenger control station of FIG. 33.

Turning now to FIGS. 33 and 34, a passenger station 300 is shown in connection with vehicle 10. Passenger station 300 includes an adjustable arm 314 slidably connected to, and extending from, base tube 310. Base tube 310 passes through the interior dash or console of vehicle 10 and connects to front cross tube 132 of chassis 100 (FIG. 34) forward of the dash. Station 300 includes a grab bar such as a pair of handles 304, 304', which allow the passenger to stabilize her or his body against the passenger seat 16 during travel over rough terrain. A tablet or other computer 302 mounts to station 300 via mounting bracket 318 (FIG. 34) to allow the passenger to easily view and manipulate information. It is contemplated that either the handles 304, 304' or the mounting bracket 318 (and computer 302) may be excluded from passenger station 300, as required or desired for a particular application.

Handles 304 and tablet 302 can be adjusted toward or away from the passenger and passenger seat 16 by sliding arm 314 into or out of base tube 310. In an extended position, adjustable arm 314 defines a first distance from the passenger seat 16 that is less than a second distance defined by the retracted position. Lock lever 306 may be fixed to one of the handles 304 to selectively lock sliding arm 314 in a desired axial position. For example, lock lever 306 may be released to allow a lock mechanism (e.g., a friction lock) within tube 310 to disengage from arm 314. When arm 314 is in the desired position, lever 306 may be re-engaged to activate the lock mechanism and fix arm 314 in position relative to base tube 310. Lock lever 306 may be operably coupled to the lock mechanism by a cable 307, for example.

Base tube 310 is fixed to cross tube 132 via clamp 312, which includes two clamping mechanisms substantially perpendicular to one another which are joined by a central clamp body. A second clamp 316 affixes mounting bracket 318 to adjustable arm 314 via another clamp mechanism, which also affixes handles 304, 304' to arm 314. For example, handles 304, 304' may be made from a single U-shaped piece of tubing or bar stock as best seen in FIG. 34. Clamp 316 may be adjustable to allow the handles 304, 304' and mounting bracket 318 to be rotated into a desired position relative to the passenger.

Communicator toggle 308 may be mounted to one of the handles 304, 304', as shown in FIG. 33. Toggle 308 may be a button electrically connected to a communicator wire 309, for example. Toggle 308 may be used by the passenger to activated an internal communication system to communicate with the driver of vehicle 10 over noisy environments, such as during high-speed driving. Moreover, passenger station 300 is useful for a navigator of a two-person race team, who may wish to access maps and other navigation or course information via the tablet 302 and share information discerned with the driver using the communicator toggle 308.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A chassis for a side-by-side utility vehicle, the chassis comprising:
- a front chassis section comprising:
- a primary tubular assembly defining an upper quadrilateral and a front quadrilateral; and
- a reinforcing tubular assembly fixed to the primary tubular assembly, the reinforcing tubular assembly having cross braces defining an upper triangle and a lower triangle with a junction therebetween, wherein the upper triangle is larger than the lower triangle;
- a rear chassis section;
- a left chassis section positioned longitudinally between the front chassis section and the rear chassis section; and
- a right chassis section positioned longitudinally between the front chassis section and the rear chassis section and laterally spaced from the left chassis section.

2. The chassis of claim 1, wherein the cross braces of the reinforcing tubular assembly are interconnected to form an X-shaped brace.

3. The chassis of claim 1, wherein the chassis comprises left and right A-pillars having a cross tube extending therebetween, and a front weldment, and wherein:
- the upper triangle is defined by the cross tube and upper portions of the cross braces; and
- the lower triangle is defined by an upper edge of the front weldment and lower portions of the cross braces.

4. The chassis of claim 3, wherein:
- the upper triangle has upper corners formed by the junctions between the cross tube and the left and right A-pillars, and a lower corner formed by the junction between the cross braces; and
- the lower triangle has lower corners formed by the junctions between the cross braces and the front weldment, and an upper corner formed by the junction between the cross braces.

5. The chassis of claim 3, wherein the front weldment comprises:
- a right-side pair of clamshell braces cooperating to define:
- an upper right tube receiver sized and configured to receive a right front tube of the primary tubular assembly; and
- an angled right tube receiver sized and configured to receive a first one of the cross braces of the reinforcing tubular assembly; and
- a left-side pair of clamshell braces cooperating to define:
- an upper left tube receiver sized and configured to receive a front left tube of the primary tubular assembly; and
- an angled left tube receiver sized and configured to receive a second one of the cross braces of the reinforcing tubular assembly.

6. The chassis of claim 5, wherein the front weldment comprises:
- a left stanchion forming a left-side box-like structure, the left-side pair of clamshell braces welded to an upper portion of the left stanchion;
- a right stanchion forming a right-side box-like structure, the right-side pair of clamshell braces welded to an upper portion of the right stanchion; and
- a base plate welded to the right stanchion and the left stanchion.

7. The chassis of claim 5, wherein:
- the front weldment comprises a joiner tube;
- the right-side pair of clamshell braces cooperate to define a right joiner tube receiver configured to receive a right end of the joiner tube; and the left-side pair of clamshell braces cooperate to define a left joiner tube receiver configured to receive a left end of the joiner tube.

8. The chassis of claim 7, wherein:

the front chassis section includes a right steering rack cradle tube and a left steering rack cradle tube;

a rear half of the right-side pair of clamshell braces defines a right cradle tube receiver configured to receive the right steering rack cradle tube; and a rear half of the left-side pair of clamshell braces defines a left cradle tube receiver configured to receive the left steering rack cradle tube.

9. The chassis of claim 1, wherein the reinforcing tubular assembly is contained within the outer bounds of the primary tubular assembly.

10. The chassis of claim 2, wherein the reinforcing tubular assembly includes a pair of joiner plates which sandwich the junction of the cross braces therebetween.

11. The chassis of claim 10, wherein a first one of the cross braces extends continuously across the joiner plates, and a second one of the cross braces is cut, abutted and fixed to the first one of the cross braces to create an X-shaped junction therebetween.

12. The chassis of claim 11, wherein the joiner plates have a series of apertures through which welding to an underlying tube surface may be accomplished.

13. A chassis for a side-by-side utility vehicle, the chassis comprising:

a front chassis section comprising a plurality of front tubes welded to one another and a front weldment formed from a first plurality of sheet metal components welded to one another, the front tubes welded to the front weldment;

a rear chassis section comprising a plurality of rear tubes welded to one another and a rear weldment formed from a second plurality of sheet metal components welded to one another, the rear tubes welded to the rear weldment;

a left chassis section positioned longitudinally between the front chassis section and the rear chassis section; and a right chassis section positioned longitudinally between the front chassis section and the rear chassis section and laterally spaced from the left chassis section.

14. The chassis of claim 13, wherein the left chassis section includes a left B-pillar and the right chassis section includes a right B-pillar, and wherein:

the plurality of rear tubes include a left upper frame tube extending from the rear weldment toward an upper portion of the left B-pillar, and a right upper frame tube extending from the rear weldment toward an upper portion of the right B-pillar;

the rear weldment comprises a front plate and a rear plate spaced apart longitudinally and generally parallel to one another the front plate and the rear plate joined by spreader brackets to create a welded box-like structure; and the left upper frame tube is fixed directly to an upper left corner of the box-like structure and the right upper frame tube is fixed directly to an upper right corner of the box-like structure.

15. The chassis of claim 14, wherein:

the rear chassis section includes a left lower frame tube extending forwardly from the rear weldment toward a lower portion of the left chassis section, and a right lower frame tube extending forwardly from the rear weldment toward a lower portion of the right chassis section;

the rear weldment further comprises a base plate welded to a lower portion of the box-like structure and extending forwardly from the front plate; and the left lower frame tube welded to a left forward corner of the base plate, and the right lower frame tube welded to a right forward corner of the base plate, whereby tubes of the chassis extend to a lower-rear corner of the chassis.

16. The chassis of claim 15, wherein the rear weldment further comprises a cross brace welded to a front end of the base plate, the left lower frame tube and the right lower frame tube welded to the base plate via the cross brace.

17. The chassis of claim 13, wherein the front chassis section further comprises a reinforcing tubular assembly fixed to the plurality of front tubes, the reinforcing tubular assembly having cross braces defining an upper triangle and a lower triangle with a junction therebetween.

18. The chassis of claim 17, wherein the front weldment comprises:

a right-side pair of clamshell braces cooperating to define:

an upper right tube receiver sized and configured to receive a right front tube of the front chassis section;

an angled right tube receiver sized and configured to receive a first one of the cross braces of the reinforcing tubular assembly; and a left-side pair of clamshell braces cooperating to define:

an upper left tube receiver sized and configured to receive a front left tube of the front chassis section;

an angled left tube receiver sized and configured to receive a second one of the cross braces of the reinforcing tubular assembly.

19. The chassis of claim 18, wherein the front weldment comprises:

a left stanchion forming a left-side box-like structure, the left-side pair of clamshell braces welded to an upper portion of the left stanchion;

a right stanchion forming a right-side box-like structure, the right-side pair of clamshell braces welded to an upper portion of the right stanchion; and a base plate welded to the right stanchion and the left stanchion.

20. The chassis of claim 18, wherein:

the front weldment comprises a joiner tube;

the right-side pair of clamshell braces cooperate to define a right joiner tube receiver configured to receive a right end of the joiner tube; and the left-side pair of clamshell braces cooperate to define a left joiner tube receiver configured to receive a left end of the joiner tube.

21. The chassis of claim 20, wherein:

the front chassis section includes a right steering rack cradle tube and a left steering rack cradle tube;

a rear half of the right-side pair of clamshell braces defines a right cradle tube receiver configured to receive the right steering rack cradle tube; and a rear half of the left-side pair of clamshell braces defines a left cradle tube receiver configured to receive the left steering rack cradle tube.

* * * * *